United States Patent
Roy et al.

(10) Patent No.: US 12,526,711 B2
(45) Date of Patent: Jan. 13, 2026

(54) METHOD AND APPARATUS FOR CELL RESELECTION IN A WIRELESS COMMUNICATION SYSTEM

(71) Applicant: SAMSUNG ELECTRONICS CO., LTD., Suwon-si (KR)

(72) Inventors: Koustav Roy, Bangalore (IN); Arijit Sen, Bangalore (IN); Shouvik Guha, Bangalore (IN); Nitesh Pushpak Shah, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 566 days.

(21) Appl. No.: 17/994,157

(22) Filed: Nov. 25, 2022

(65) Prior Publication Data

US 2023/0164651 A1    May 25, 2023

Related U.S. Application Data

(63) Continuation of application No. PCT/KR2022/018341, filed on Nov. 18, 2022.

(30) Foreign Application Priority Data

Nov. 25, 2021 (IN) .............................. 202141054520
Sep. 16, 2022 (IN) .............................. 202141054520

(51) Int. Cl.
*H04W 36/08* (2009.01)
*H04W 36/00* (2009.01)
*H04W 36/30* (2009.01)

(52) U.S. Cl.
CPC ....... *H04W 36/08* (2013.01); *H04W 36/0061* (2013.01); *H04W 36/00837* (2018.08); *H04W 36/30* (2013.01)

(58) Field of Classification Search
CPC ........... H04W 36/08; H04W 36/00837; H04W 36/0061; H04W 36/30
(Continued)

(56) References Cited

U.S. PATENT DOCUMENTS 10,492,108 B2    11/2019    Wu
2016/0095156 A1    3/2016    Mitra et al.
(Continued)

FOREIGN PATENT DOCUMENTS

EP    3370476    9/2018
KR    10-2019-0116015    10/2019
(Continued)

OTHER PUBLICATIONS

Search Report and Written Opinion dated Mar. 29, 2023 issued in International Patent Application No. PCT/KR2022/018341.
(Continued)

*Primary Examiner* — Joel Ajayi
(74) *Attorney, Agent, or Firm* — NIXON & VANDERHYE P.C.

(57) ABSTRACT

The present disclosure relates to an apparatus and method for cell reselection in a wireless communication system. The method comprises: determining whether a User Equipment (UE) is in an inactive mode supported by a serving cell and detecting a trigger for reselection of the serving cell for the UE, while the UE is in the inactive mode. The method further comprises identifying, based on the detection, a plurality of neighbouring cells available for being connected to the UE. The method also comprises selecting a first cell, from among the plurality of the neighbouring cells, that supports the inactive mode of the UE, for connecting with the UE.

20 Claims, 24 Drawing Sheets

(58) Field of Classification Search
USPC .......................................................... 455/436
See application file for complete search history.

(56) References Cited

U.S. PATENT DOCUMENTS

| | | |
|---|---|---|
| 2018/0270713 A1 | 9/2018 | Park et al. |
| 2018/0279204 A1 | 9/2018 | Kim et al. |
| 2019/0313303 A1 | 10/2019 | Jung et al. |
| 2020/0037212 A1 | 1/2020 | Ramachandra et al. |
| 2020/0128484 A1 | 4/2020 | Su et al. |
| 2020/0260522 A1 | 8/2020 | Chen |
| 2021/0037433 A1 | 2/2021 | Lee et al. |

FOREIGN PATENT DOCUMENTS

| | | |
|---|---|---|
| KR | 10-2222830 | 3/2021 |
| WO | 2019/136664 | 7/2019 |
| WO | 2019/226006 | 11/2019 |

OTHER PUBLICATIONS

3GPP TSG-RAN, "Two-Stage Cell Reselection Mechanism for UEs in RRC_INACTIVE", Meeting Notes, Meeting #102, May 21, 2018, 6 pages.
3GPP TSG-RAN, "User equipment (UE) procedures in idle mode and RRC inactive state", V16.6.0, Sep. 27, 2021, 40 pages.
3GPP TSG-RAN, "Cell selection and reselection enhancements for NTN", Meeting Notes, Meeting #116, Nov. 1, 2021, 3 pages.
3GPP TSG-RAN, "Report from [113-e][105][NTN] Idle mode aspects", Meeting Notes, Meeting #113, Jan. 25, 2021, 23 pages.
Indian Office Action issued Sep. 5, 2023 in corresponding Indian Patent Application No. 202141054520.
3GPP Technical Specification Group Radio Access Network, Medium Access Control (MAC) protocol specification, published Mar. 2022, 221 pages.
3GPP Radio Resource Control (RRC) protocol specification, published Mar. 2022.
Http://www.techplayon.com/5g-nr-rrc-procedure-states/, published Nov. 19, 2017, 6 pages.
Http://www.sharetechnote.com/html/5G/5G_RRC_Overview.html, 4 pages.
Http://www.techplayon.com/5g-nr-new-radio-rrc-state-transitions/, published Nov. 19, 2017, 8 pages.
Extended European Search Report dated Feb. 4, 2025 issued in European Patent Application No. 22898960.4.
3GPP TSG-RAN WG2, "Inter-RAT mobility in Rrc Inactive state", Meeting Notes, Meeting #101, Feb. 16, 2018, 5 pages.
3GPP TSG-RAN WG2, "Enhanced intersystem mobility in RRC_INACTIVE in spotty NR coverage", Meeting Notes, Meeting #107, Aug. 15, 2019, 19 pages.

METHOD AND APPARATUS FOR CELL RESELECTION IN A WIRELESS COMMUNICATION SYSTEM

CROSS-REFERENCE TO RELATED APPLICATIONS

This application is a continuation of International Application No. PCT/KR2022/018341, designating the United States, filed on Nov. 18, 2022, in the Korean Intellectual Property Receiving Office and claiming priority to Indian Provisional Patent Application Number 202141054520, filed on Nov. 25, 2021, in the Indian Patent Office, and to Indian Complete Patent Application Number 202141054520, filed on Sep. 16, 2022, in the Indian Patent Office, the disclosures of each of which are incorporated by reference herein in their entireties.

BACKGROUND

Field

The disclosure relates to a method and apparatus for cell reselection in a wireless communication system.

Description of Related Art

In new radio (NR) or $5^{th}$ generation (5G) access technology, there is an addition of a radio resource control (RRC) inactive mode between an RRC connected mode and an idle mode. Accordingly, a network and/or a user equipment (UE) can optionally stay in the inactive mode without completely releasing the RRC connected mode when there is no traffic and can quickly switch back to connected mode whenever necessary, as shown in FIG. 1. In particular, when the UE is powered up, it is in disconnected mode/idle mode. The UE moves to RRC connected with initial attach or with connection establishment. If there is no activity from UE for a short time, the UE suspends its session by moving to RRC inactive mode and resumes its session by moving to RRC connected mode. The UE can move to RRC Idle mode from RRC connected or RRC Inactive mode. The new RRC inactive mode has various important characteristics which are not currently being used. Some of the characteristics of new RRC Inactive Mode are mentioned here below:

1) A UE specific Discontinuous Reception (DRX) may be configured by upper layers or by RRC layer;
2) UE controlled mobility based on network configuration;
3) UE stores the UE inactive Access Stratum context;
4) A Radio Access Network (RAN) based notification area (RNA) is configured by the RRC layer;
5) UE:
   monitors short messages that are transmitted with Paging-Radio Network Temporary Identifier (P-RNTI) over a downlink control information (DCI);
   monitors a paging channel for Core Network paging using 5G Serving Temporary Mobile Subscriber Identity (S-TMSI) and RAN paging using full Inactive-RNTI (I-RNTI);
   performs neighbouring cell measurements and cell (re-) selection;
   performs RAN-based notification area updates periodically and when moving outside the configured RAN-based notification area;
   acquires system information and can send system information (SI) requests (if configured).

The RRC modes (e.g., connected, idle, inactive) are a solution to a communication system access, power saving, and mobility optimization using the above-mentioned characteristics. Also, 5G has to support enhanced Mobile Broadband (eMBB), Ultra Reliable Low Latency Communications (URLLC), and massive IoT services at the same cost and energy dissipation per day per area. The RRC modes may also help in achieving these goals for 5G. 5G system access and requested services have different characteristics and control of connectivity for future services needs be to flexible and programmable. To meet these different services characteristics, a new RRC mode model is required. Some of the characteristics of the service are:

To support Ultra-Reliable Low-Latency Communication (URLLC) services which transmits small packets that require ultra-low latency and/or high reliability Massive IoT Devices wakes up seldom power saving mode to transmit and receive a small payload.

Devices need to camp in low activity mode, and sporadically transmits UL data and/or status reports with small payload to the network.

Devices need periodic and/or sporadic DL small packet transmission.

When UE is in the connected mode, and sporadically transmit UL data and/or status reports with small payload to the network.

Smartphones and consumer devices that eMBB UE have periodic and/or sporadic UL and/or DL small packet transmission and extreme data rates.

However, the existing technologies do not utilize the characteristics of the RRC modes and there is a need to utilize the RRC modes to provide system access, power saving, and mobility optimization.

SUMMARY

The disclosure provides a method and apparatus for (re)selecting a cell that supports an inactive mode in a wireless communication system.

According to an example embodiment of the disclosure, a method for cell reselection in a wireless communication system is provided. The method comprises: determining whether a User Equipment (UE) is in an inactive mode supported by a serving cell; detecting a trigger for reselection of the serving cell for the UE, while the UE is in the inactive mode; identifying, based on the detection, a plurality of neighbouring cells available for being connected to the UE; and selecting a first cell, from among the plurality of the neighbouring cells, that supports the inactive mode of the UE, for connecting with the UE.

According to an example embodiment, a UE for cell reselection in a wireless communication system, is disclosed. The UE comprises: a memory and a processor coupled to the memory. The processor is configured to: determine whether the UE is in an inactive mode supported by a serving cell, detect a trigger for reselection of the serving cell for the UE, while the UE is in the inactive mode, identify, based on the detection, a plurality of neighbouring cells available for being connected to the UE, and select a first cell, from among the plurality of the neighbouring cells, that supports the inactive mode of the UE, for connecting with the UE.

To further clarify the advantages and features of the present disclosure, a more detailed description will be provided with reference to various example embodiments thereof, which is illustrated in the appended drawings. It will be appreciated that these drawings depict example embodiments of the disclosure and are therefore not to be considered limiting its scope. The disclosure will be explained with greater specificity and detail with reference to the accompanying drawings.

BRIEF DESCRIPTION OF THE DRAWINGS

These and other features, aspects, and advantages of certain embodiments of the present disclosure will be more apparent from the following detailed description, taken in conjunction with the accompanying drawings, in which like characters represent like parts throughout the drawings, wherein.

Figure 1:
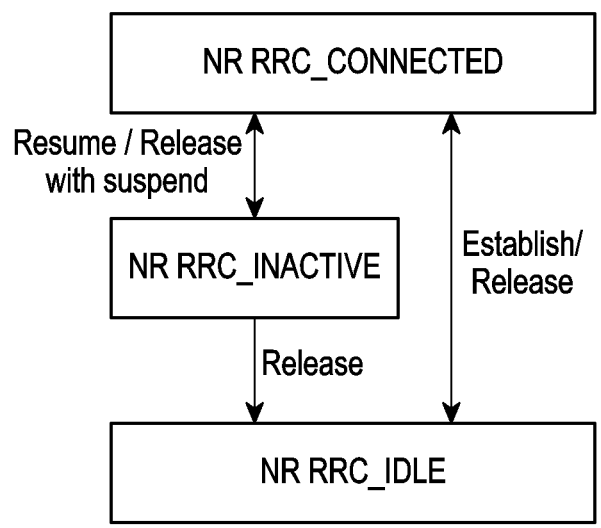
FIG. 1 is a diagram illustrating a UE mode machine and mode transitions in NR, according to the conventional art.

Further, skilled artisans will appreciate that elements in the drawings are illustrated for simplicity and may not have been necessarily drawn to scale. For example, the flowcharts illustrate various example methods in terms of operations involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to various example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this disclosure to "an aspect", "another aspect" or similar language may refer, for example, to a particular feature, structure, or characteristic described in connection with the embodiment being included in at least one embodiment of the present disclosure. Thus, appearances of the phrase "in an embodiment", "in another embodiment" and similar language throughout this disclosure may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Hereinafter, a base station (BS) may be an entity that allocates resource to a terminal, such as an eNodeB (eNB), a Node B, a radio access network (RAN), an access network (AN), a RAN node, an NR NB, a gNB, a wireless access unit, a BS controller, or a node over network. The BS may be a network entity including at least one of an IAB-donor, which is a gNB providing network access to UE(s) through a network of backhaul and access links in the NR system, and an IAB-node, which is a RAN node supporting NR backhaul links to the IAB-donor or another IAB-node and supporting NR access link(s) to UE(s).

A UE is wirelessly connected through the IAB-node and may transmit/receive data to and from the IAB-donor connected with at least one IAB-node through the backhaul link. The UE may include a terminal, a mobile station (MS), a cellular phone, a smartphone, a computer, or a multimedia system capable of performing communication functions. Herein, a downlink (DL) refers to a wireless transmission path of signal transmitted from the BS to the terminal, and an uplink (UL) refers to a wireless transmission path of signal transmitted from the terminal to the BS.

The phrase "at least one of," when used with a list of items, may refer, for example, to different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" may refer, for example, to one or more. Accordingly, a set of items can be a single item or a collection of two or more items. As used herein, the term "and/or" includes all or any of the elements and all combinations of one or more of the associated listed items.

Figure 2:
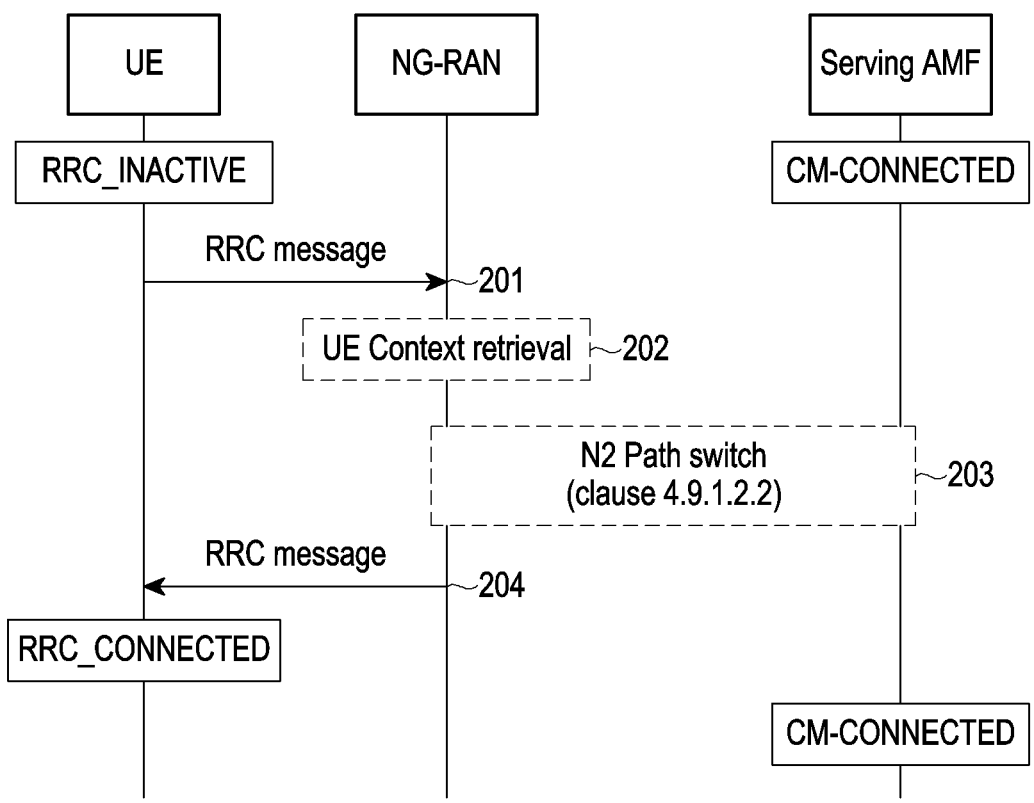
FIG. 2 is a signal flow diagram illustrating transition from RRC inactive mode to RRC connected mode, according to the conventional art.

As per the existing art, transition from the RRC inactive mode to RRC connected mode requires more signalling and results in large delay in transition, as shown in FIG. 2. Signalling associated in RRC Resume Request, e.g., transition to RRC connected mode is shown below:

At 201, UE to Next Generation Radio Access Network (NG-RAN): RRC Message (Resume ID).

The UE initiates the transition from RRC Inactive mode to RRC Connected mode. The UE provides its Resume ID needed by the NG-RAN to access the UE's stored Context.

At 202.[Conditional] NG-RAN Performs UE Context Retrieval.

The UE Context retrieval is performed when the UE Context associated with the UE attempting to resume its connection is not locally available at the accessed NG-RAN. The UE Context Retrieval procedure via NG-RAN is specified in TS 38.300.

At 203.[Conditional] N2 Path Switch Procedure.

If the accessed NG-RAN is able to retrieve the UE Context, the accessed NG-RAN node initiates N2 Path Switch procedure, e.g., steps 1 to 8 of clause 4.9.1.2.2 of standard TS 38.300 and including Xn data forwarding.

If the Connection Resume procedure is a response to RAN paging which is triggered by 5G core (5GC) due to an N2 interface procedure, NG-RAN and 5GC handle the N2 interface procedure as a collision described in clause 4.9.1.2 of standard TS 38.300. The NG-RAN sends UE Notification message to report that UE is in RRC Connected if an AMF requested N2 Notification (clause 4.8.3 of standard TS 38.300) to NG-RAN.

At 204. NG-RAN to UE: RRC Message.

The NG-RAN confirms to the UE that the UE has entered RRC Connected mode.

This signalling process results in delay in transition from RRC inactive mode to RRC connected mode.

Figure 3:
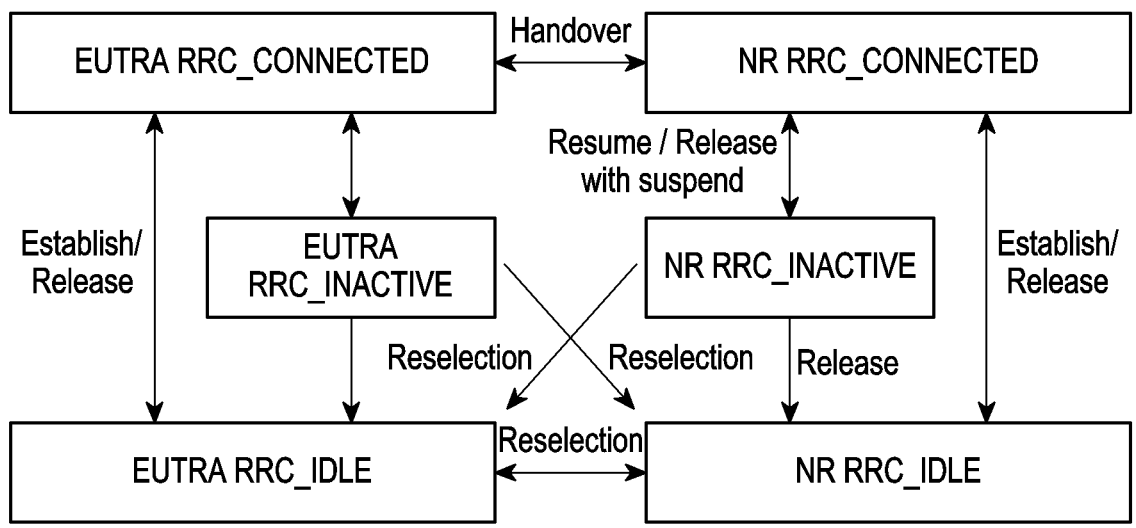
FIG. 3 is a diagram illustrating UE mode machine and mode transitions between NR/5GC, E-UTRA/EPC and E-UTRA/5GC, according to the conventional art.

According to 3GPP, on cell reselection from NR to Long-Term Evolution (LTE), as illustrated in FIG. 3, if the UE is in NR inactive mode, the UE will fall back to an LTE idle mode. Similarly, when the UE is in the LTE inactive mode and reselects an NR cell, the UE will fall back to the NR idle mode. Therefore, in the case of an inter RAT cell reselection, the UE will lose the benefit of the RRC inactive mode. In another scenario, if the UE reselects a cell outside RNA, the UE might lose RRC Inactive mode or has to send RNA update to be in inactive mode again. If this Cell reselection process keeps on happening, the UE will end up losing power in sending multiple RNA update request.

According to the 3GPP specification, the UE will send a periodic RAN notification area update (RNAU) when staying inside the RNA and if the UE is leaving the RNA area, the UE will send the RNAU. There can be multiple scenarios where the UE will be moved to the idle mode while leaving the RNA.

For example, when the UE is moving out of the RNA and outside the RNA one cell is supporting the inactive mode and other cells are not supporting inactive mode. According to the mode of the art, there is no way that the UE will know which cell supports inactive mode without sending a Resume Request. So, the UE may end up (re-)selecting a cell-based on the measured signal strength and falling back to the idle mode if the cell does not support the inactive mode.

In another scenario, the UE is moving out of the RNA and a 5G cell is not supporting the inactive mode outside the RNA or having some problem in X2 interface. In this scenario, the UE will send the RNAU once it will leave the current RAN Notification Area (RNA) and it will be rejected by the 5G Cell as there is no support for inactive mode at that cell. The UE will fall back to the idle mode even though the UE comes back to the previous RNA before a periodic timer expiry.

In another scenario, the UE is moving out of the RNA and reselects to a 4G radio access technology (RAT) (having the same core network as 5G). In this scenario, the UE will move to the idle mode from the inactive mode. Even if the UE comes back to the previous RNA within the periodic timer expiry, the UE will still be in the idle mode.

Figure 4A:
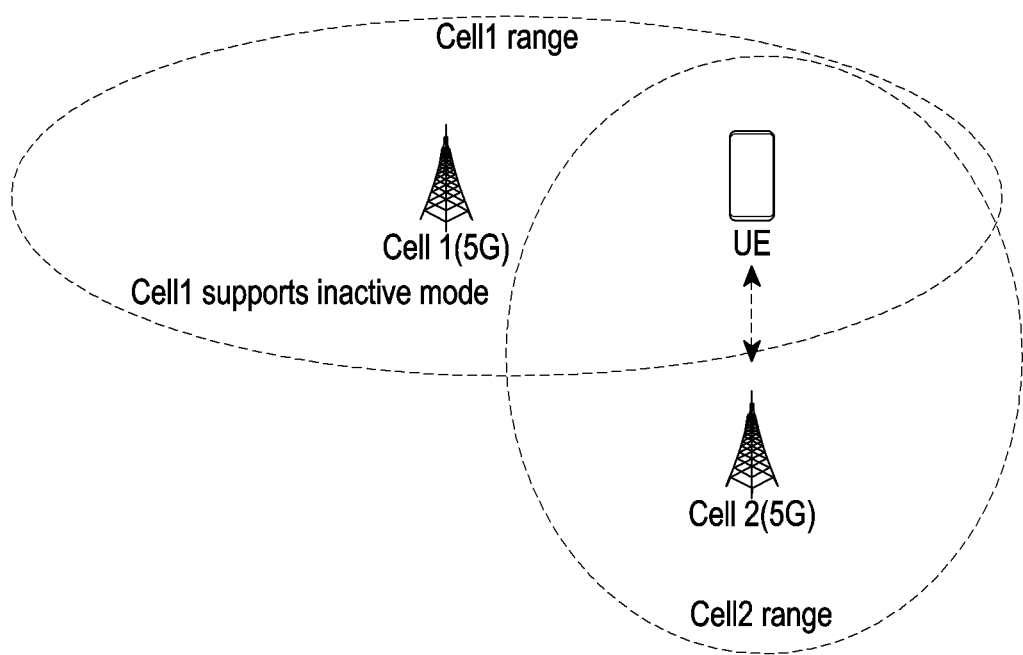
FIG. 4A is a diagram illustrating a network environment of cell re-selection to a cell not supporting inactive mode, according to the conventional art.
Figure 4B:
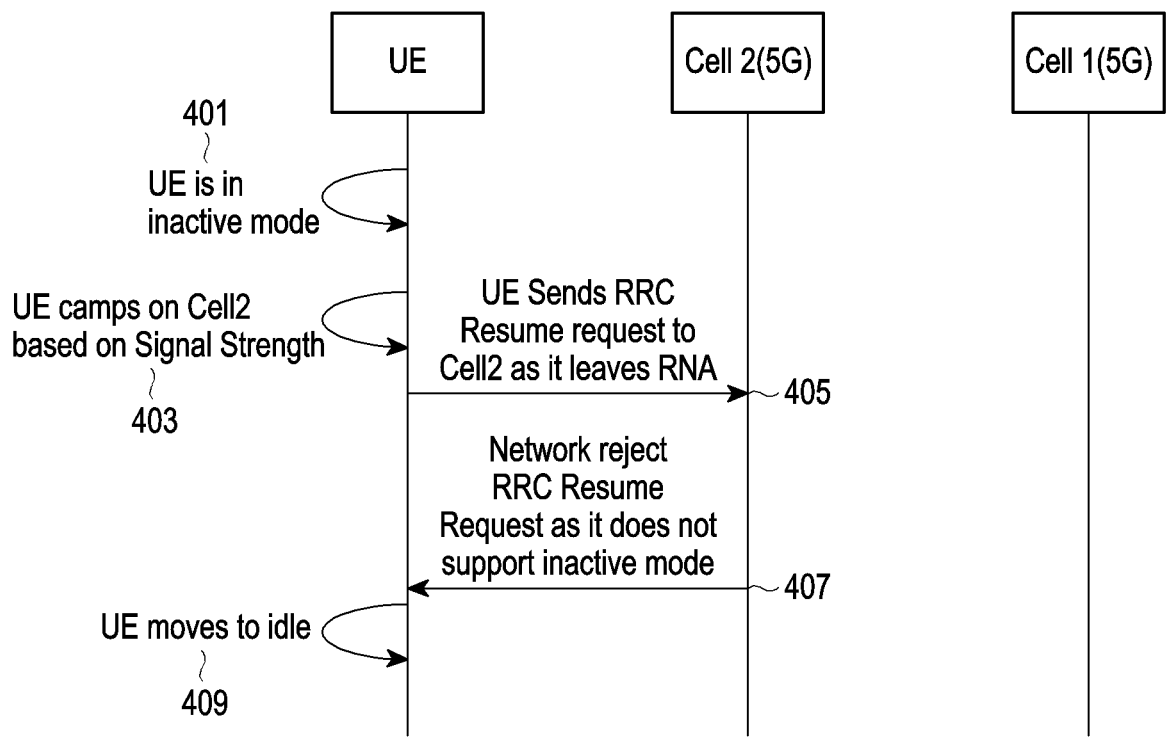
FIG. 4B is a signal flow diagram of cell re-selection to a cell not supporting inactive mode, according to the conventional art.

FIG. 4A is a diagram illustrating a network environment of cell re-selection to a cell not supporting inactive mode, according to the conventional art. FIG. 4B is a signal flow diagram of cell re-selection to a cell not supporting inactive mode, according to the conventional art. As shown in FIG. 4A, the UE upon coming out of an RNA connects to a neighbouring cell, e.g., cell2 which does not support inactive mode. Hence, the UE connects to cell2 in idle mode. As shown in FIG. 4B, at step 401, the UE is connected to a serving cell e.g., Cell1, in an inactive mode. At step 403, the UE then leaves the current RNA and camps on cell2 based on signal strength/quality of service (QoS) of cell2. In other words, the UE reselects cell2 as signal strength/QoS of cell 2 is higher than other available cells. However, cell2 does not support inactive mode. At step 405, the UE sends an RRC Resume Request to cell2. However, at step 407, the cell2 rejects the RRC Resume Request as it does not support inactive mode. Then, at step 409, the UE moves to the idle mode while being connected to cell1. Hence, even if the UE comes back to Cell1 within RNAU periodicity and reselects Cell1, it will still be in the idle mode not in active mode. It should be noted that both the serving and the neighbouring cells could belong to same RAT, e.g., 5G or the serving cell could belong to first RAT, such as 5G and the neighbouring cell could belong to different RAT, such as 4G.

Figure 5:
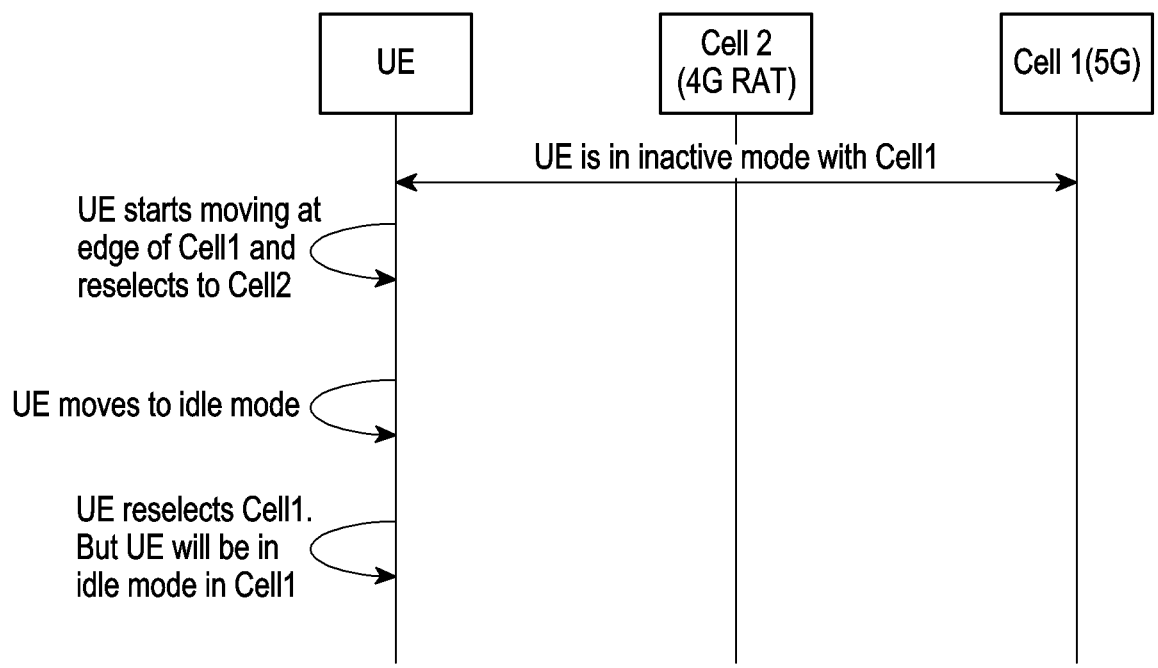
FIG. 5 is a signal flow diagram of cell re-selection to a cell of different RAT not supporting inactive mode, according to the conventional art.

However, if the neighbouring cell belongs to a different RAT than serving cell, then the UE does not send a RRC resume request to cell2. Rather, the UE connects to cell2 upon moving out of RNA and then connects back to cell1 upon expiry of RNAU timer. However, the UE connects back to cell2 in idle mode not in inactive mode. Even if the UE comes back to Cell1 within RNAU periodicity and reselects Cell1, it will still be in the idle mode not in active mode in Cell1, as shown in FIG. 5.

Figure 6:
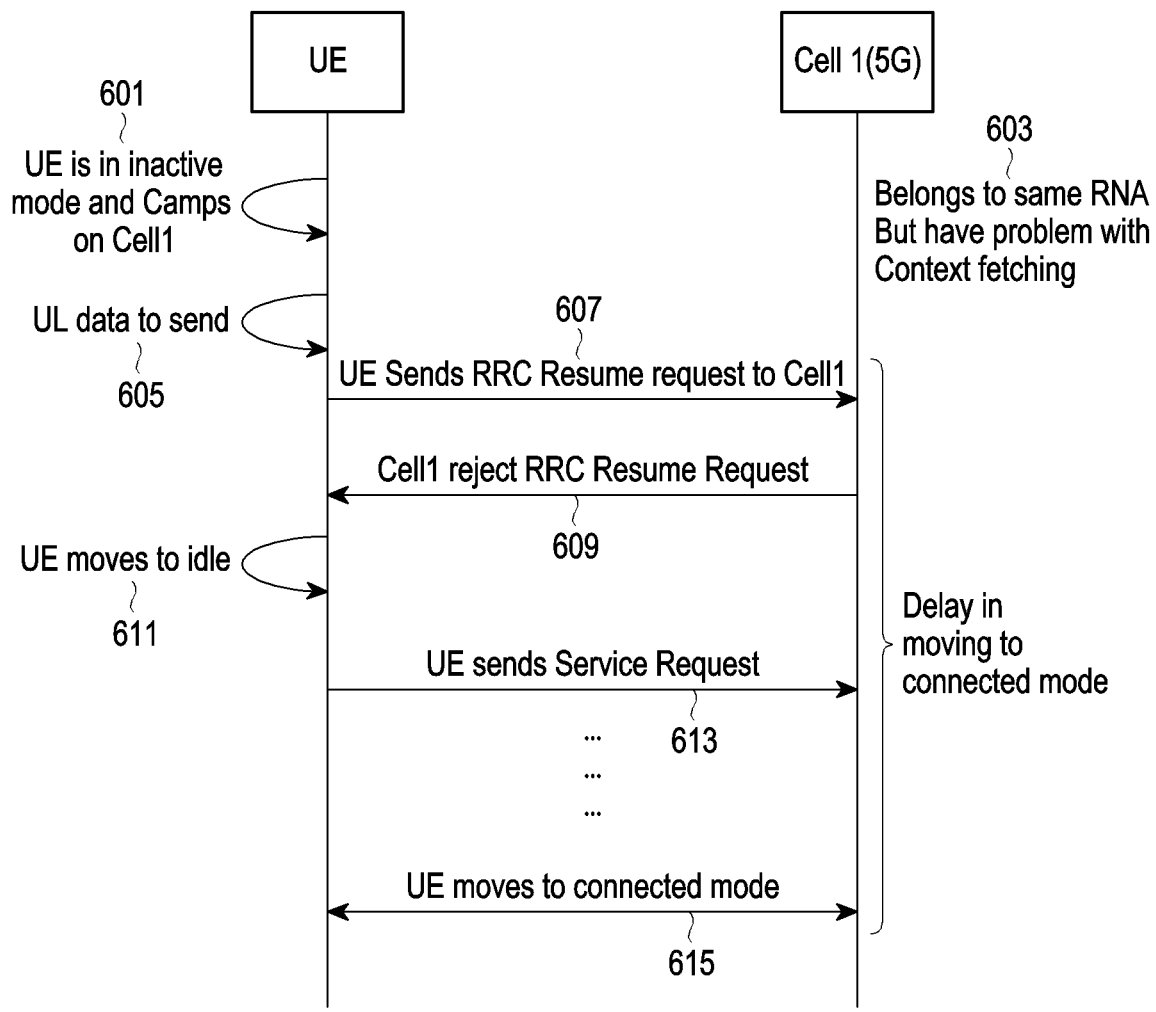
FIG. 6 is a signal flow diagram of UE losing RRC inactive mode inside RNA, according to the conventional art.

FIG. 6 is a signal flow diagram of UE losing RRC inactive mode inside RNA, according to the conventional art. As per the conventional art, during the initial deployment scenario, it is possible that some particular gNB or Next Generation e-NodeB (ng-eNB) may have a problem with context fetching (possible problem with X2 interface or deployment hole, etc.) from other gNB while the UE is in the inactive mode. Now, as shown in FIG. 6, if the UE is in the inactive mode and camps on such a cell which belongs to the same RNA but cannot fetch context of the UE from other gNB or ng-eNB at 601 and 603, then while establishing the connection or the UE moves to connected mode due to uplink (UL) data or paging message from the network at 605, At 607 and 609, the UE sends a Resume request, which is rejected by the cell1, e.g., serving cell;

At 611, the UE moves to idle mode;

At 613 and 615, the UE sends a service request to move to connected mode again.

This situation introduces an extra amount of delay and signaling overhead for the UE in the inactive mode. Especially for Ultra-Reliable Low Latency Communications (URLLC) kind of traffic, this latency can cause degraded performance.

Figure 7A:
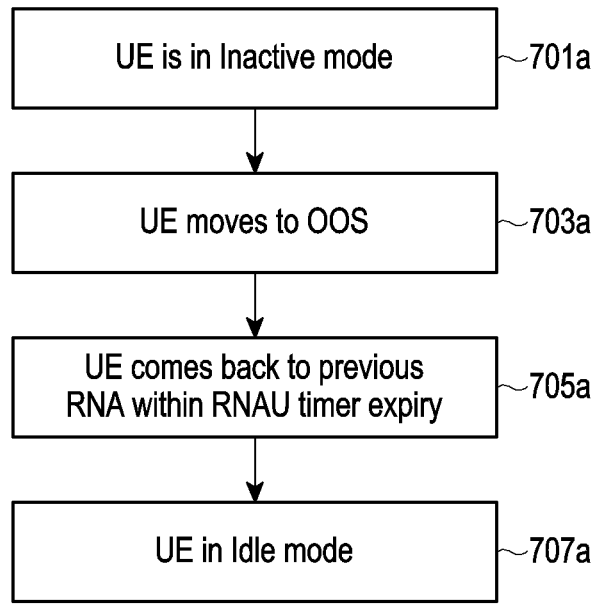
FIG. 7A is a flowchart illustrating a process for UE losing inactive mode after coming back from OOS, according to the conventional art.
Figure 7B:
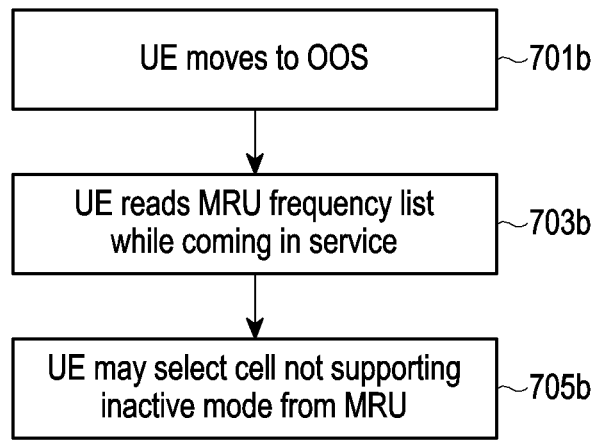
FIG. 7B is a flowchart illustrating a process for UE re-selecting a cell not supporting inactive mode after coming back from OOS, according to the conventional art.

As per existing art, during initial camping or out of service area (OOS) recovery, the UE will lose the inactive mode, as shown in FIGS. 7A and 7B. FIG. 7A is a flowchart illustrating a process for UE losing inactive mode after coming back from OOS, according to the conventional art. As shown in FIG. 7A, at step 701*a*, the UE enters inactive mode. At step 703*a*, the UE goes out of service (OOS) from being in the inactive mode. At step 705*a*, the UE comes back to previous RAT or previous RNA within RNAU timer expiry. At step 707*a*, the UE connects with the previous RAT in idle mode. This way the UE will lose inactive mode facilities, even the cell supports the inactive mode.

FIG. 7B is a flowchart illustrating a process for UE re-selecting a cell not supporting inactive mode after coming back from OOS, according to the conventional art. As shown in FIG. 7B, at step 701*b*, the UE moves to OOS. At step 703*b*, the UE reads a Most Recently Used (MRU) frequency list to select a cell to connect while coming out of OOS. Now if MRU has frequencies which do not support the inactive mode, then the UE will select a cell which does not support inactive mode, as shown at step 705*b*. Hence, the UE can never go to the inactive mode after coming back from the out of service area.

Figure 8:
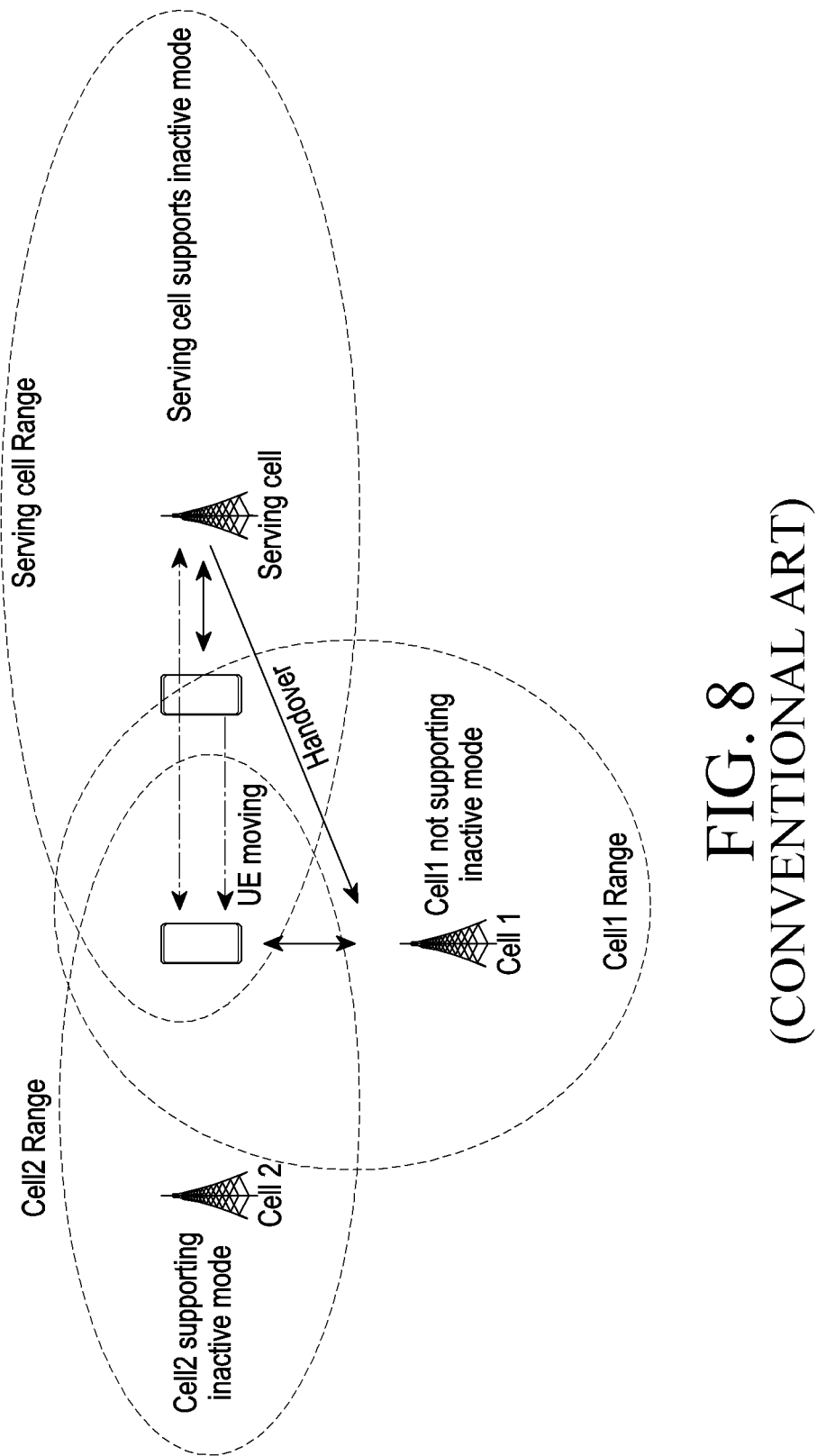
FIG. 8 is a diagram illustrating a network environment of a UE losing RRC inactive mode during handover, according to the conventional art.

FIG. 8 is a diagram illustrating a network environment of a UE losing RRC inactive mode during handover, according to the conventional art. As shown in FIG. 8, Cell1 is not supporting the inactive mode where Cell2 (having acceptable signal strength/quality but lesser signal strength/QoS compared to Cell1) is supporting the inactive mode. According to the mode of the art, the UE will select cell1 during handover as the signal strength/QoS of cell 1 is greater than that of cell 2. Hence, the UE will not be in the inactive mode.

Accordingly, if during connected mode mobility, the UE gets handover to such cells which does not support the inactive mode (e.g., RAT is not connected to 5GC or RAT does not support the inactive mode), the UE will never get RRC inactive mode advantages or the UE always falls back to the idle mode after data transmission is over. Inactive mode optimizations have been introduced in 5G mainly to reduce signaling overhead and associated delay especially in URLLC, massive IoT, and eMBB traffic. So, in case the UE gets handover to the cell that does not support the inactive mode, the UE will always be in the idle or connected mode.

According to 3GPP, if the UE is performing RRC Resume Request and in between any cell reselection takes place, the UE will move to the idle mode, and resume request will fail. For example, the UE has UL data to transmit or downlink (DL) data to receive (Paging triggers RRC Resume request), and the UE reselects to a better cell while performing an RRC Resume Request, it will take more time for the UE to go to a connected mode even compared to the RRC idle mode. In particular, the UE sends the RRC Resume Request, then Cell Reselection takes place. The UE then moves to Idle mode and the UE triggers Service Request and go to connected mode.

Further, as per 3GPP Spec TS 38.331-5.3.13.6, during Cell re-selection or cell selection while T390, T319 or T302 is running (UE in RRC_INACTIVE) The UE shall:

1>if cell reselection occurs while T319 or T302 is running:

2>perform the actions upon going to RRC_IDLE as specified in 5.3.12 with release cause 'RRC Resume failure. Table 1 below defines timers and their management criteria for transition of the UE to connected mode, in accordance with 3GPP.

TABLE 1

| Timer | Start | Stop | At Expiry |
|---|---|---|---|
| T319 | Upon transmission of RRCResumeRequest or RRCResumeRequest1 | Upon reception of RRCResume, RRCSetup, RRCRelease, RRCRelease with suspendConfig or RRCReject message, cell re-selection and upon abortion of connection establishment by upper layers | Perform the actions as specified in 5.3.13.5. |
| T302 | Upon reception of RRCReject while performing RRC connection establishment or resume, upon reception of RRCRelease with waitTime. | Upon entering RRC_CONNECTED or RRC_IDLE, upon cell re-selection and upon reception of RRCReject message. | Inform upper layers about barring alleviation as specified in 5.3.14.4 |

Figure 9:
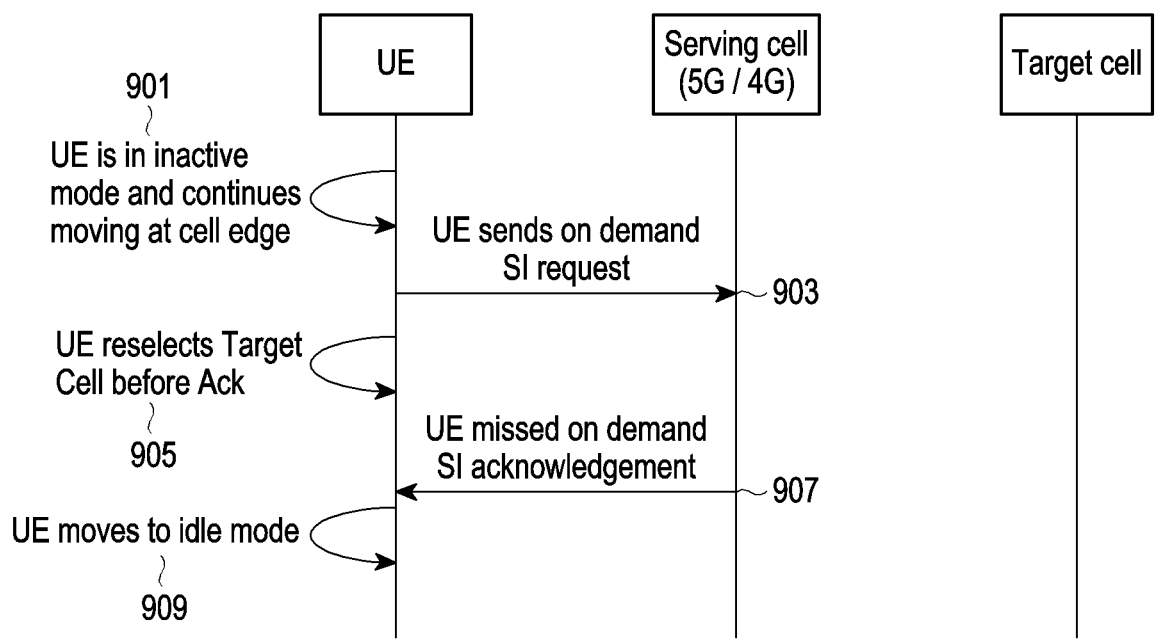
FIG. 9 is a signal flow diagram of UE performing on-demand system info request, according to the conventional art.

Furthermore, according to 3GPP Spec TS 38.331:

5.2.2.3.3 defines request for on-demand system information as:

1>if cell reselection occurs while waiting for the acknowledgment for SI request from lower layers:

2>reset MAC;

2>if SI request is based on RRCSystemInfoRequest message:
3>release RLC entity for SRBO FIG. 9 is a signal flow diagram of UE performing on-demand system info request, according to the conventional art. According to 3GPP, if the UE is performing on-demand system info request and cell reselection takes place before the acknowledgment arrives then the UE will move to an idle mode. Therefore, if the UE is at the edge of a Cell and performs System Info (SI) Request, the UE may lose Inactive mode advantages. Further, the UE will also consume more power by moving to the connected mode and transmitting RRC System Info Request, which will eventually be useless as the UE already moves to a different cell. As shown in FIG. 9, the UE is in Inactive mode and continues moving at service cell edge at 901. UE then sends on demand SI request to the serving cell at 903. However, UE reselects a target cell before receiving acknowledgement of SI request from the serving cell at 905. Thus, the UE misses on demand SI acknowledgement at 907 and moves to idle mode at 909.

Further, in case the UE supports band combinations where supported primary band falls outside the RAN notification area or that particular primary band does not support the inactive mode facilities due to deployment scenarios and the UE gets handover to that cell during mobility, the UE can never be in the inactive mode. For example, if the UE supports the following band combinations:
n2AA+n5A+n261A
n261AA+n2A+n66A
n71AA+n260A+n5A At a particular location, the serving cell supports the inactive mode only in Sub6 or frequency range 1 (FR1) bands (e.g., while in n261 band UE will always be either in the connected mode or the idle mode due to no inactive mode support). Now due to some deployment scenario, if the network handover (with or without measurement report) the UE to n261 as a primary band and goes to the idle mode, then the UE cannot use the inactive mode facilities.

The present disclosure addresses the above mentioned problems. According to an embodiment of the present disclosure, the UE will prioritize current RAT (if not inside RAN) during cell (re-)selection while in the inactive mode to utilize inactive mode facilities as long as possible. This helps the UE to go to the connected mode within very less time and will consume less signalling overhead. This is very beneficial for URLLC kind of traffic as latency will be significantly low.

For example, if the UE is in 5G inactive mode and multiple RATs are present at a particular location, the UE will prioritize 5G RAT over any other RAT. For example, if the UE camped on 5G RAT is at a cell edge of current RNA area while in the inactive mode and the UE detects two or more cells suitable for cell reselection, even though the UE may find a 4G Cell has more reference signal received power/reference signal received quality (RSRP/RSRQ) compared to 5G Cell at that location, the UE will still prefer 5G Cell to camp to stay in inactive mode to avoid falling in the idle mode.

Similarly, if the UE is in 4G inactive mode and multiple RATs are present in a particular location, the UE will prioritize 4G RAT over other RATs. For example, if the UE camped on 4G RAT is at the cell edge of current RNA area while in the inactive mode and the UE detects two or more cells suitable for cell reselection, even though the UE finds 5G Cell has more RSRP/RSRQ compared to the 4G Cell at that location, the UE will still prefer the 4G Cell to camp to stay in the inactive mode.

The above discussed scenarios are explained in greater detail below with reference to FIGS. 10-24. It should be noted that the methods as described in reference to FIGS. 10-24 may be performed by a UE.

Figure 10:
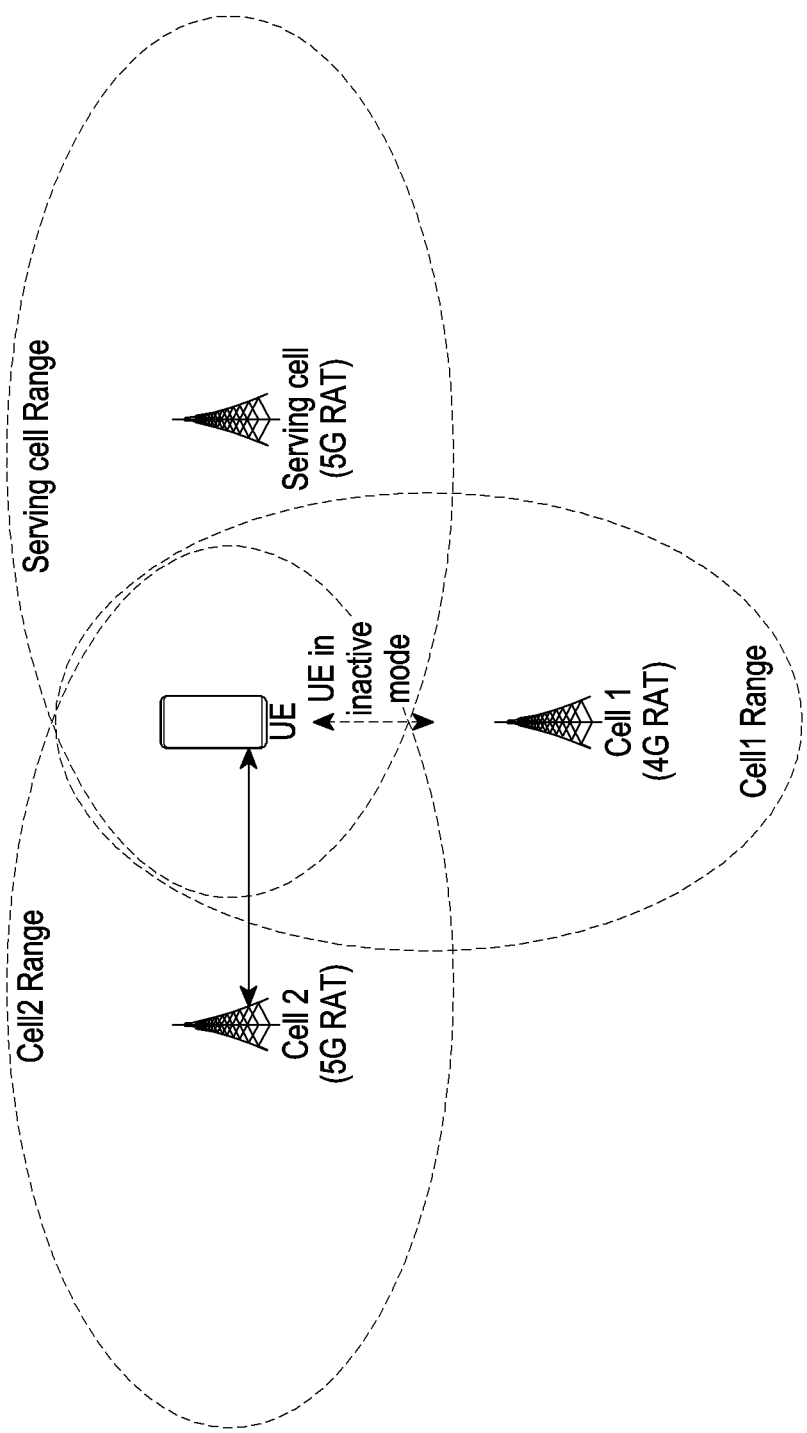
FIG. 10 is a diagram illustrating an example network environment of cell re-selection in an inactive mode, according to various embodiments.

FIG. 10 is a diagram illustrating an example network environment of cell (re-)selection in an inactive mode, according to various embodiments. As shown in FIG. 10, a UE is in the inactive mode and at an edge of a serving cell, which is a 5G RAT. The UE finds Cell1 (4G RAT) has higher RSRP/RSRQ compared to Cell2 (5G RAT). Based on the conventional art, the UE will camp on Cell1. Thus, in this scenario, the UE will lose the inactive mode of operation and be in an idle mode. However, as shown in FIG. 10, in an embodiment of the present disclosure, if the UE finds Cell1 and Cell2 being suitable for Cell re-selection, even though Cell1 has higher RSRP/RSRQ, the UE will re-select Cell2 as the Cell2 is 5G RAT and supports inactive mode so that the UE can remain in the inactive mode. This is explained in greater detail below with reference to FIG. 11.

Figure 11:
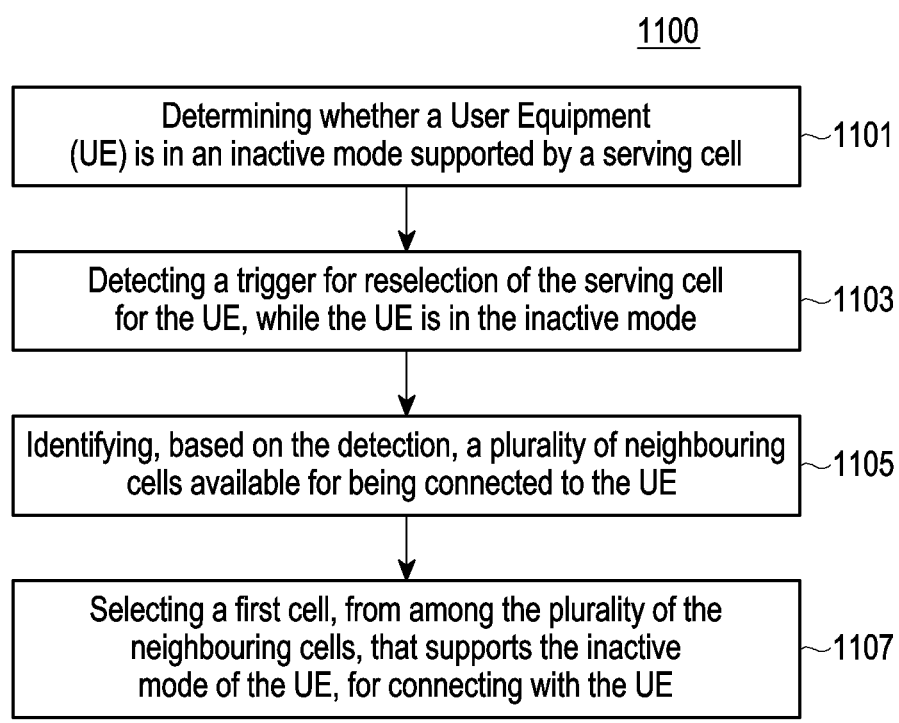
FIG. 11 is a flowchart illustrating an example method for cell reselection in a wireless communication system, according to various embodiments.

FIG. 11 is a flowchart illustrating an example method 1100 for cell reselection in a wireless communication system, according to various embodiments. It should be noted that the method as explained with reference to FIG. 11 may be performed by the UE. At 1101, the method 1100, may comprise determining whether a User Equipment (UE) is in an inactive mode supported by a serving cell. In an embodiment, this may be determined based on previous encounter or stored parameters of Global Cell id, public land mobile network (PLMN) id, frequency, Tracking Area Code (TAC) etc. The same or similar information can be derived when UE was in an RRC Inactive mode and a Network provided RAN Notification Area (Set of Tracking Area Code). These set of Tracking Area Codes can be stored and used to identify the TAC which belongs to a current Cell that supports the RRC Inactive mode or not. At 1103, the method 1100 may comprise detecting a trigger for reselection of the serving cell for the UE, while the UE is in the inactive mode. In an embodiment, the trigger may refer, for example, to an event of network parameters of the serving cell being below a predetermined threshold. In other words, if the network parameters of the serving cell are below a predetermined (e.g., specified) threshold, the trigger for reselection of the serving cell for the UE may be detected. In an embodiment, the predetermined threshold may depend on the network parameters and may be configured by a network(for example, a network of the serving cell). In an embodiment, the network parameters may include signal strength and quality parameters (RSRP/RSRQ). Accordingly, in an example embodiment, the predetermined threshold for the signal strength may be −100 dbm and the predetermined threshold for RSRP/RSRQ may be −19 dbm.

At 1105, the method 1100 may comprise identifying, based on the detection, a plurality of neighbouring cells available for being connected to the UE.

At 1107, the method 1100 may comprise selecting a first cell, from among the plurality of the neighbouring cells, that supports the inactive mode of the UE, for connecting with the UE. In an embodiment, the network parameters of the first cell are above a predefined threshold. In an embodiment, the predefined threshold may depend on the network parameters and may be configured by a network(for example, a network of the serving cell). In an embodiment, the network parameters may include signal strength and quality parameters (RSRP/RSRQ). In an embodiment, the predefined parameters may be same as the predetermined parameters. In an alternate embodiment, the predefined parameters may be different than the predetermined parameters.

In an example, with reference to FIG. 10, the plurality of neighbouring cells may be cell1 and cell 2. As discussed with reference to FIG. 10, the selected first cell may be the cell2 as this cell supports the inactive mode. In FIG. 10, both the first cell and the serving cell may belong to a same RAT, e.g., 5G. However, in an embodiment, the serving cell and the first cell may belong to different RAT, e.g., the serving cell may relate to 5G, and the first cell may relate to 4G or vice-versa.

Similarly, both the cells, e.g., the serving cell and the first cell may relate to a same RNA or may relate to different RNA. In an embodiment, if the first cell and the serving cell belong to different RNA, then an RNA Update (RNAU) is transmitted with a stored inactive mode context. The stored inactive mode context is discussed in greater detail below with reference to FIG. 12.

In an embodiment, the method 1100, before selecting the first cell, may determine whether the first cell supports the inactive mode using associated cell information of the first cell. If the associated cell information indicates that the first cell has previously supported the inactive mode, then it is determined that the first cell supports the inactive mode. In an embodiment, the UE stores associated cell information, for example, which cells are supporting RRC inactive mode and which cells are not supporting the RRC inactive mode. The UE may store this information in a database (DB) in the form of a table. In an example, the UE may keep a voting system to store the information whether a cell supports inactive mode or not. In particular, whenever a cell pushes the UE in an idle mode, this information can be stored as the cell in favor of not supporting the RRC inactive mode. Again, if any cell rejects an RRC Resume Request from the UE, this information can be stored as the cell in favor of not supporting the RRC inactive mode. If in the past any cell has pushed the UE to the RRC inactive mode or accepts then RRC Resume Request, this information can be stored as the cell in favor of supporting RRC inactive mode. In an embodiment, the associated cell information may include cell id, public land mobile network (PLMN) id, Tracking Area Code (TAC), serving frequency, RAT type (5G/4G), core network type, band information, RRC inactive mode support (true/false) information. Table 2 below shows an example of stored information and type in which the information is stored.

TABLE 2

| Stored Info | Type |
| --- | --- |
| Cell id | Text |
| PLMN id | Text |
| Serving Frequency | Long |
| TAC | Text |
| RAT Type | Text |
| CN Type | Text |
| Band information | Text |
| RRC inactive mode support | Boolean |

The associated cell information may be used to reduce signaling overhead, power consumption and utilize inactive mode in a more efficient manner way, as discussed in greater detail below with reference to FIGS. 12-22.

Figure 12:
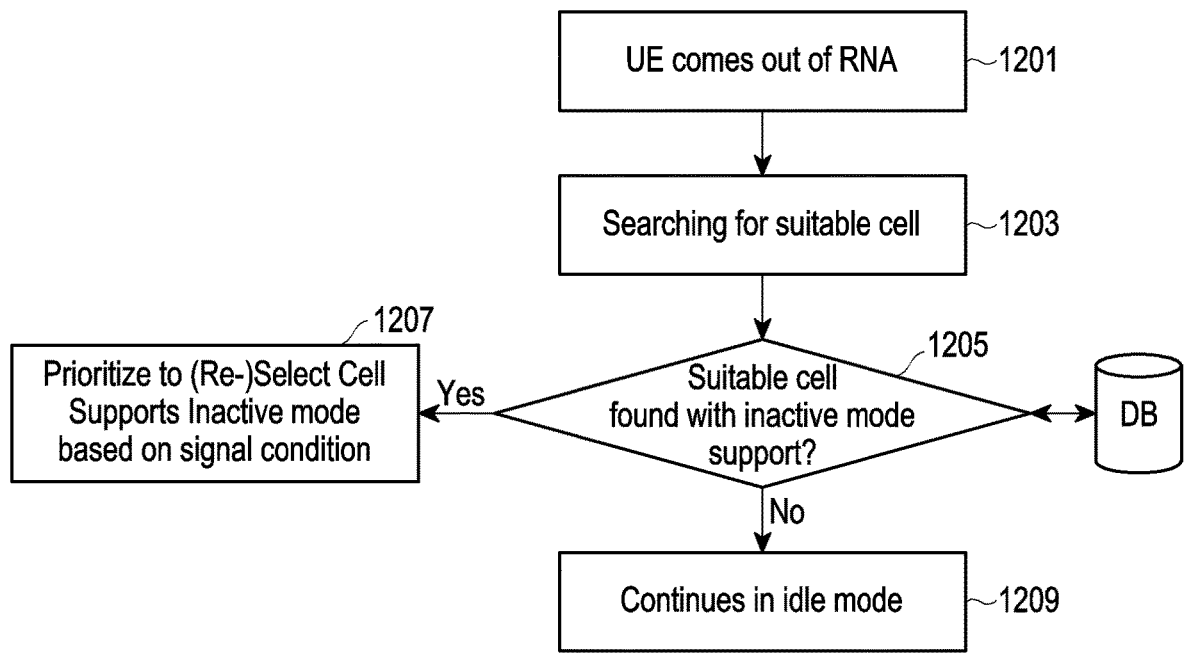
FIG. 12 is a flowchart illustrating an example method for cell reselection in a wireless communication system using associated cell information, according to various embodiments.

FIG. 12 is a flowchart illustrating an example method for cell reselection while UE is leaving RNA, according to various embodiments. As shown in FIG. 12, at 1201, the UE is coming out of RNA. At 1203, the UE searches for neighbouring cell to reconnect. At 1205, it is determined if there is any neighbouring cell which supports inactive mode using the associated cell information stored in the data base. If there is any neighbouring cell which supports the inactive mode, then, at 1207, the UE reselects a cell which supports the inactive mode. This way UE can be in the Inactive mode even after moving out of RNA. If not, then at 1209, the UE moves to idle mode. Hence, the UE prioritizes a cell supporting the inactive mode over a cell does not support the inactive mode.

In a scenario, if the UE knows that a current camped cell is not supporting an RRC inactive mode, then sending RNAU to that cell when going out of RNA ends up getting rejection of RNAU request. So, the UE loses unnecessary power and move to an idle mode even it comes back to the previous RNA within RNAU periodic time expiry. In an embodiment, the present disclosure addresses this problem. In an embodiment, if the UE learns based on the previous experience or crowdsourced information that the current camped cell outside previous RNA does not support the RRC inactive mode, the UE will not send the RNAU request to the current cell and will store the previous RRC inactive mode context and be in the idle mode in the current camped cell. When the UE gets back to the previous RNA and if the UE finds the previous RNAU periodicity has not expired, the UE will continue operating in the RRC inactive mode with the inactive mode context stored in the database. In an embodiment, the inactive mode context may include Security Keys, data radio bearer (DRB), Signaling Radio Bearer (SRB) information, etc. For example, the UE stores inactive mode context in the database when the UE was connected in the inactive mode and the UE can connected back to inactive mode using this stored context.

Figure 13:
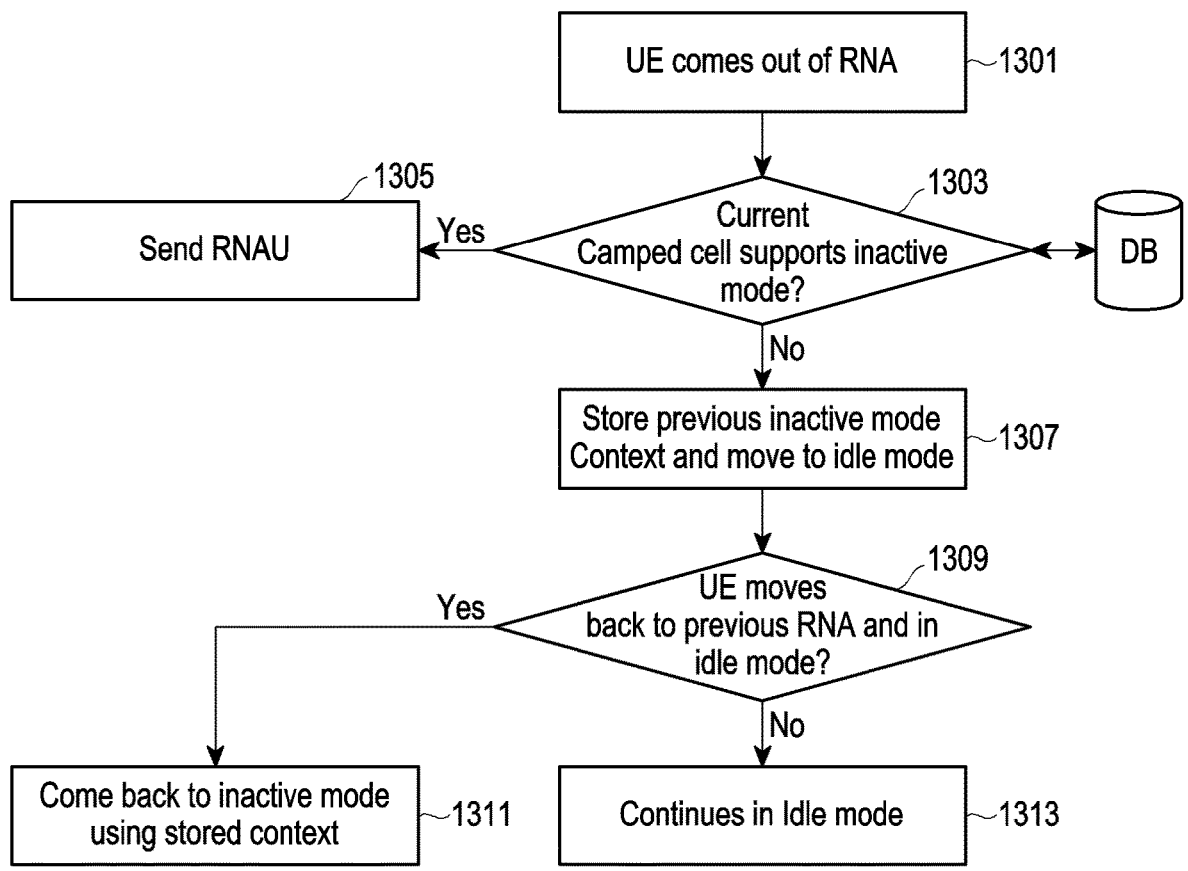
FIG. 13 is a flowchart illustrating an example method for cell reselection using inactive mode context, according to various embodiments.

FIG. 13 is a flowchart illustrating an example method for cell reselection using inactive mode context, various embodiments. As shown in FIG. 13, at 1301, the UE is coming out of an RNA. At 1303, the UE determines if the cell at which the UE is currently camped on supports the inactive mode based on the associated cell information stored in the database. If the cell at which the UE is currently camped on supports the inactive mode, then, at 1305, the UE sends RNAU to the current camped cell. If no, then, at 1307, the UE stores the inactive mode context and moves to an idle mode. At 1309, it is determined if the UE (in idle mode) moves back to the previous RNA within the periodic timer expired. If yes, then at 1311, the UE moves back to the inactive mode without any further processing using the stored inactive mode context. If no, then at 1313, the UE remains in idle mode.

Figure 14:
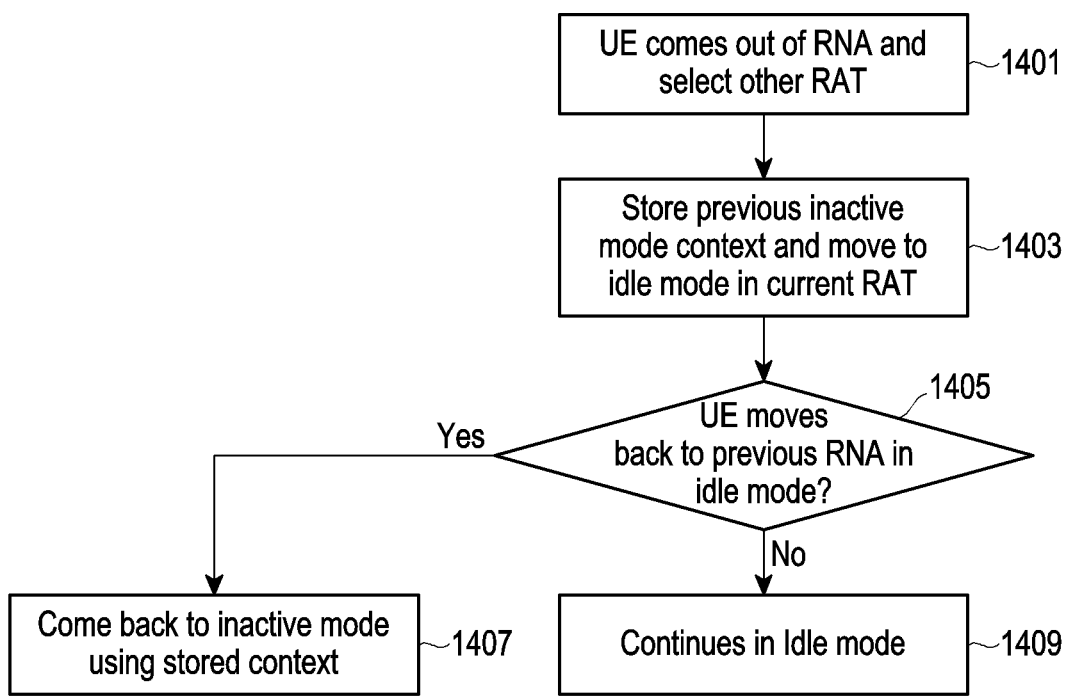
FIG. 14 is a flowchart illustrating an example method for cell reselection in a wireless communication system according to various embodiments.

FIG. 14 is a flowchart illustrating an example method for cell reselection in a wireless communication system, according to various embodiments. As shown in FIG. 14, at 1401, the UE comes out of a RNA, e.g., RNA1 and selects a neighbouring cell with RAT different than the serving cell but having the same core network. At 1403, the UE connects to the neighbouring cell in an idle mode and store a previous inactive mode context of RNA 1. At 1405, it is determined if the UE comes back to the previous RNA within a periodic time expiry. If yes, then at 1407, the UE comes back to RNA 1 in the inactive mode using stored context. While connecting back to RNA 1, the UE may or may not send RRC Resume request. If no, then at 1409, the UE continues in the idle mode.

During initial deployment scenario, it is possible that some particular gNB or ng-eNB may have a problem with context fetching (possible problem with X2 interface or deployment hole, etc.) from other gNB while UE is in an inactive mode. So, if a UE selects such a cell while being in the inactive mode and wants to move to a connected mode by sending an RRC Resume Request, then that request may be rejected, and coming to the connected mode takes even longer time compared to the UE in the idle mode. To avoid this situation, in an embodiment of the present disclosure, the UE prioritizes reselection of cells inside the RNA that can support inactive mode based on stored associated cell information to avoid falling back to the idle mode. This aspect is further discussed in greater detail below with reference to FIG. 15.

Figure 15:
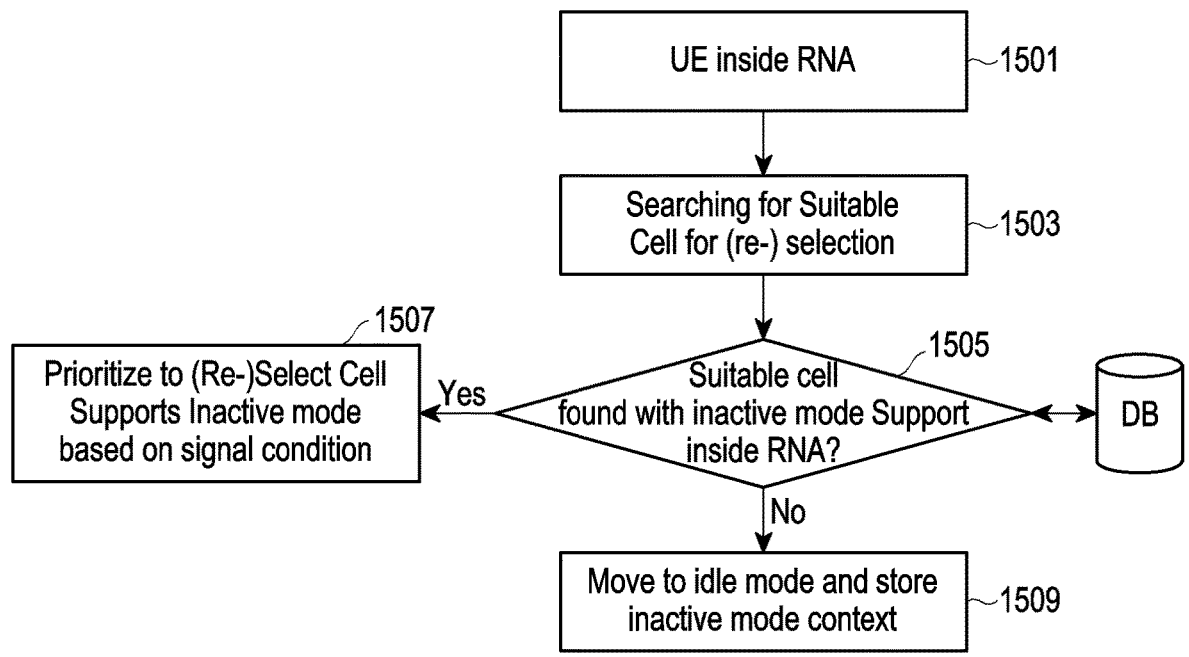
FIG. 15 is a flowchart illustrating an example method for cell reselection in a wireless communication system according to various embodiments.

FIG. 15 is a flowchart illustrating an example method for cell reselection in a wireless communication system, according to various embodiments. At 1501, the UE is inside the RNA. At 1503, the UE searched for suitable cell for reselection. At 1505, it is determined if the cells inside the RNA supports the inactive mode based on associated cell information. If yes, then at 1507, the UE connects to that cell using stored inactive context. If no, then at 1509, the UE move to the idle mode and store the inactive mode context to camp on those cells to avoid signaling delay due to rejection of Resume Request while moving to the connected mode. Hence, no extra signaling is needed as the RNA is the same. This way the UE can minimize/reduce the delay and signaling overhead of faulty network. Especially for URLLC kind of traffic, this latency improvement can be very significant.

In an example embodiment, a UE is not in the RRC inactive mode (RRC idle mode) and is in the border area of two neighbouring cells, where one cell is supporting RRC inactive mode (for example cell x) and another is not supporting the RRC inactive mode (for example cell y). Then the UE will prioritize moving to the cell x even though the cell y has better network parameters or is higher in the neighbour cell reselection ranking list. This aspect is described in greater detail below with reference to FIG. 16.

Figure 16:
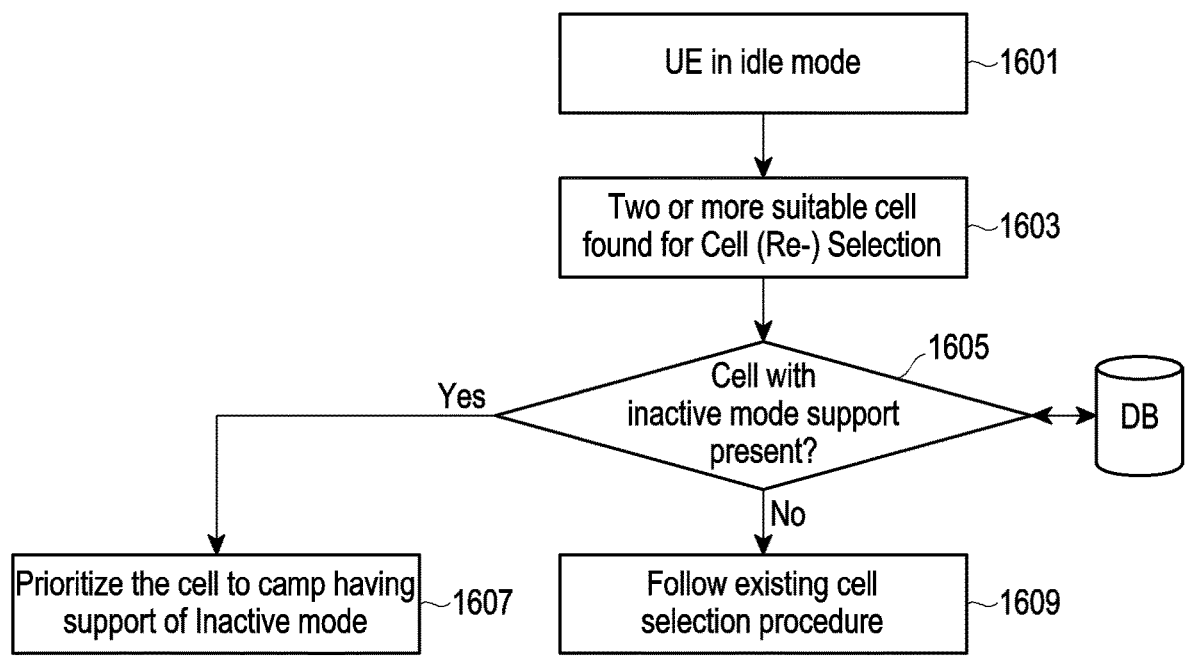
FIG. 16 is a flowchart illustrating an example method for cell reselection in a wireless communication system in idle mode, according to various embodiments.

FIG. 16 is a flowchart illustrating and example method for cell reselection in a wireless communication system in idle mode, according to various embodiments. As shown in FIG. 16, at 1601, the UE is in idle mode. At 1603, the UE searches for neighboring cells for reselection. For example, the UE may find two neighbouring cells. In an embodiment, network parameters of these two neighbouring cells are above the predetermined threshold. At 1605, it is determined if any of the neighbouring cells supports the inactive mode using the associated cell information. If any of the neighbouring cells supports the inactive mode, then at 1607, the UE camps on the cell which supports the inactive mode. If no, then, at 1609, the UE selects the cell using existing methods. For example, the UE may select the cell which has higher network parameters.

In an embodiment, during initial camping or Out of Service (OOS) area recovery, the UE selects the "stored Frequency Cell Selection" based on a Most Recently Used (MRU) Frequency list. The UE (RRC layer) to realign the MRU frequency list and keep the frequencies on the top on which the UE had earlier found cells with the RRC inactive support so that such frequencies are searched first on which the UE had earlier found the cells which support RRC inactive mode. This aspect is discussed in greater detail below with reference to FIG. 17.

Figure 17:
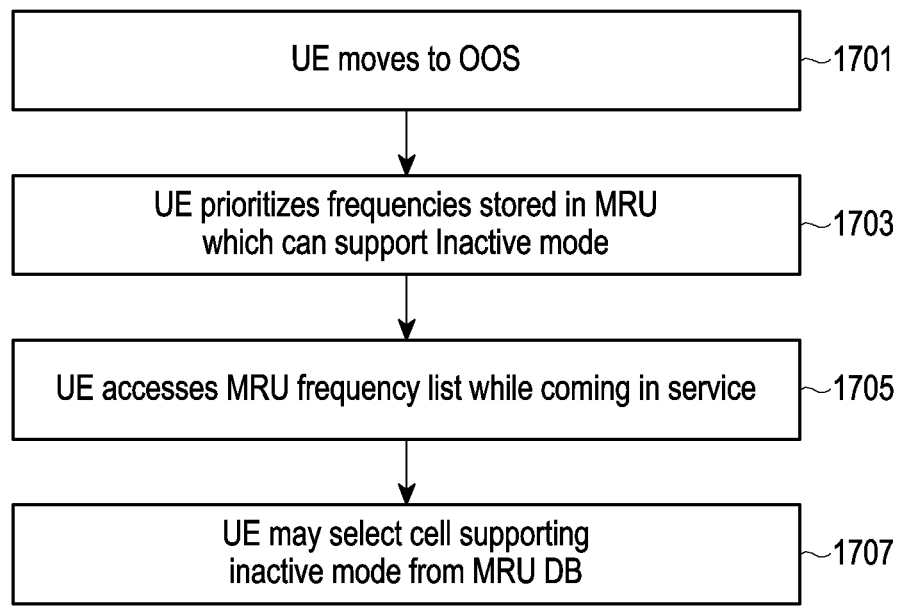
FIG. 17 is a flowchart illustrating an example method for cell reselection in a wireless communication system in out of service (OOS) area, according to various embodiments.

FIG. 17 is a flowchart illustrating an example method for cell reselection in a wireless communication system in out of service (OOS) area, according to various embodiments. As shown in FIG. 17, at 1701, the UE moves to OOS area. At 1703, the UE prioritizes the frequencies stored in MRU For example, if UE the identifies from stored information that most recent used frequency does not support inactive mode then the UE can try next frequency until it finds inactive mode support true for a stored frequency. The network can use sorting most recently used frequencies based on inactive mode support. If both frequencies support inactive mode, the UE can choose most recent frequency. At 1705, the UE accesses the MRU list. At 1707, the UE may select the cell supporting the inactive mode from the MRU.

According to existing techniques, once the UE goes in OOS area and comes back to a cell, it will be in idle mode even if UE was in inactive mode while moving to OOS area and the UE comes back within periodic timer expiry. This way every time UE falls to OOS area, the UE loses inactive mode facilities. The present disclosure addresses this.

Figure 18:
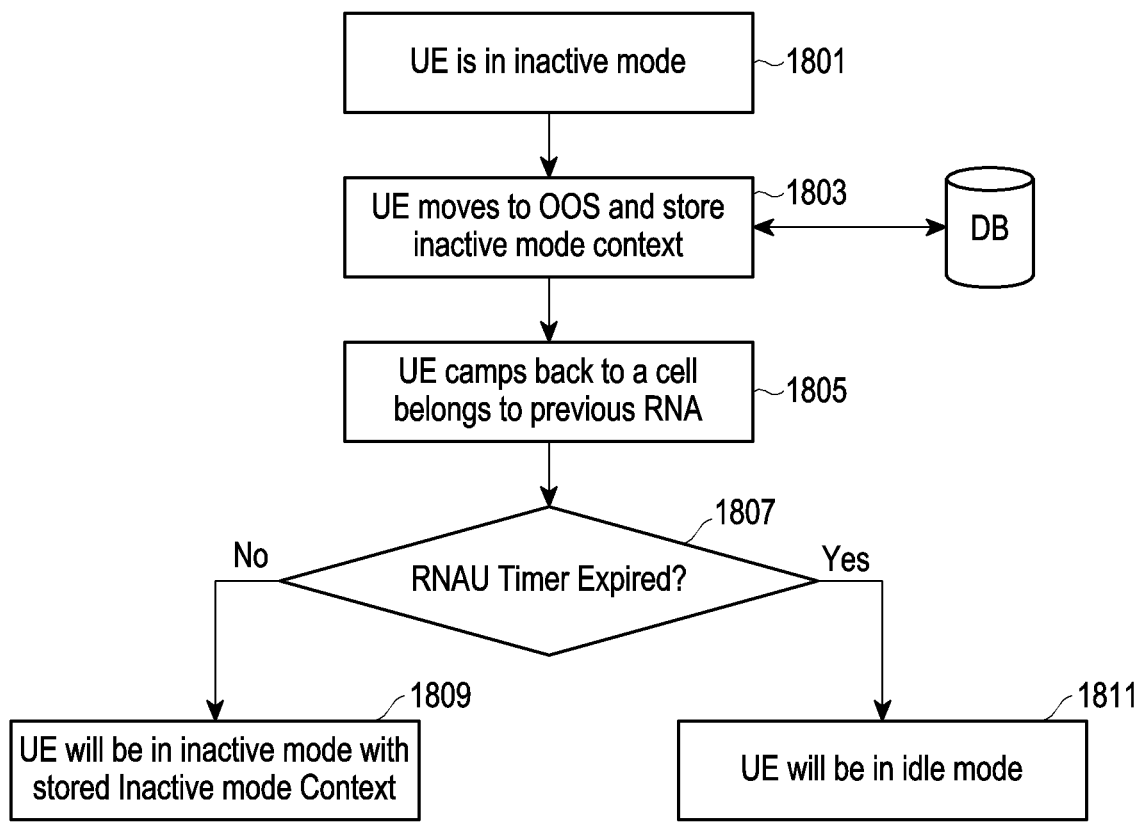
FIG. 18 is a flowchart illustrating an example method for cell reselection in a wireless communication system when the UE is coming out of service (OOS) area, according to various embodiments.

FIG. 18 is a flowchart illustrating an example method for cell reselection in a wireless communication system when the UE is coming out of service (OOS) area, according to various embodiments. At 1801, the UE is in an inactive mode. At 1803, the UE moves to OOS area and stores inactive mode context in a memory. At 1805, the UE comes back to a cell which belongs to previous RNA from OOS. At 1807, the UE determines if RNAU timer is expired. If the RNAU timer is not expired, then at 1809, the UE connects to the RNA in inactive mode using inactive mode context. If yes, then at 1811, the UE connects to the RNA in idle mode.

In an embodiment, the associated cell information and the stored inactive mode context may be used during handover. In an embodiment, when the network configures the UE for measurement report (MR), the UE prioritizes measurement of those cells that support inactive mode based on the associated cell information, if inactive mode supported cells are present. The UE may consider an implementation specific threshold with regards to the other cells for which MR is triggered but do not support the RRC inactive mode over the cell supporting RRC inactive mode and will prioritize the RRC inactive cell's in the MR if the delta condition is fulfilled (so as to not handover to a cell with poor network parameters). In an embodiment, the delta condition may be configured. In an embodiment, the delta condition may be a dynamic parameter or a network configured parameters, for example 10 dbm.

In case of a network initiated handover procedure, the UE can prioritize cells supporting inactive mode in measurement report (MR). In case of conditional handover, the UE sends random access channel (RACH) to a cell which can support inactive mode. The UE avoids being connected to a cell which does not support inactive mode if inactive mode supported cells are present in measurement object configuration. This way, the UE continues latching on to cells that can support inactive mode and avoid being in idle mode. This process is explained in greater detail below with reference to FIG. 19.

Figure 19:
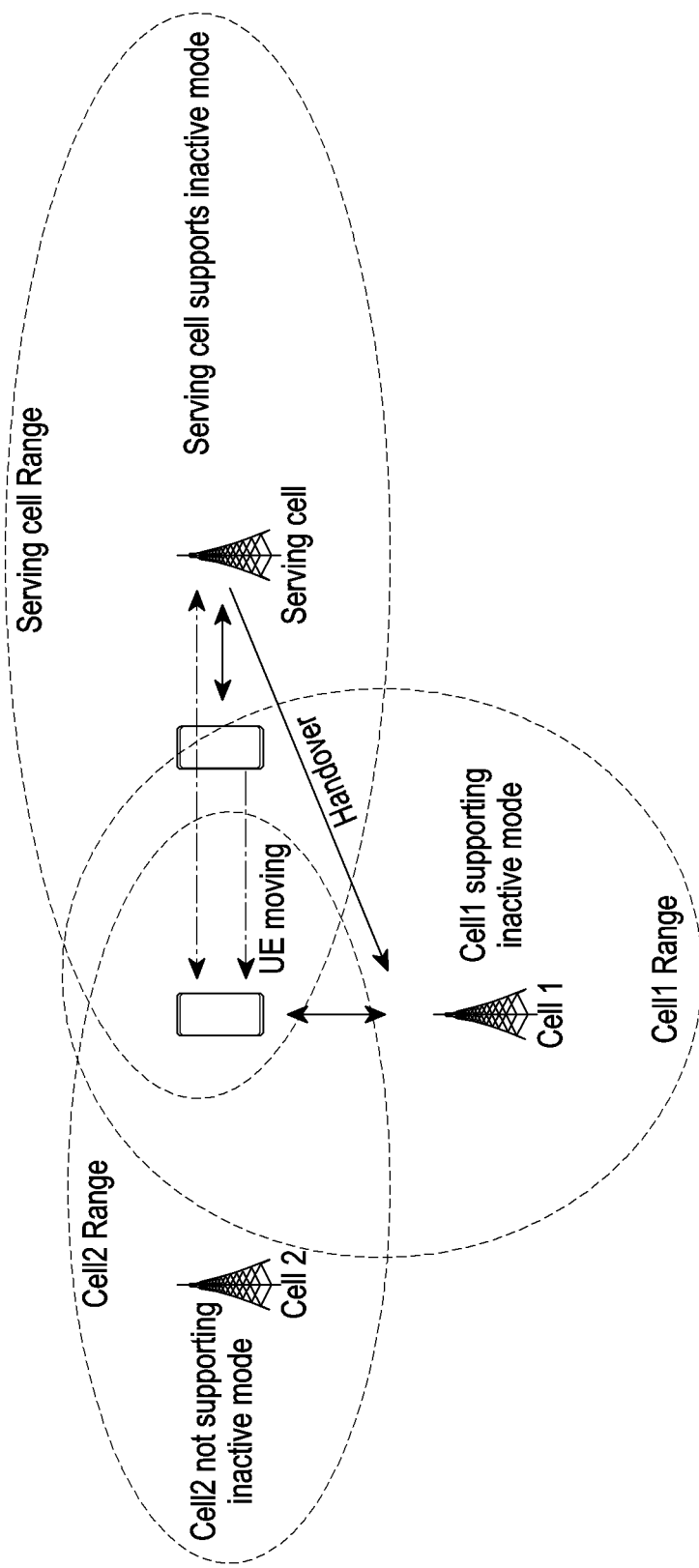
FIG. 19 is a diagram illustrating an example network environment of cell reselection in a wireless communication system during handover, according to various embodiments.

FIG. 19 is a diagram illustrating an example network environment of cell reselection in a wireless communication system during handover, according to various embodiments. As shown in FIG. 19, the UE is moving from the serving cell and finds two cells, e.g., cell 1 and cell 2 as neighbouring cells for handover. As can be seen that cell 1 supports the inactive mode while cell 2 does not. Hence, the UE selects cell 1 to complete the handover in inactive mode. Hence, when the UE is disconnected from the first cell, the UE selects a second cell, from among the plurality of neighbouring cells, wherein the second cell supports the inactive mode.

Further, when data transfer is ongoing on a serving cell which does not support the RRC inactive mode as per the associated cell information, then when sending the A2 event (Carrier aggregation scenario) or A3, A5 event (neighbour cell measurement reporting scenario) the UE can prioritize cells which support the RRC inactive Mode by modifying the reported signal strengths in the MR report. This will ensure that when the data transfer ends then network can move the UE to the RRC inactive mode. This modification in measurement values will be performed only when Pcell and Scell (event A2 case) or Serving and Neighbour cells (event A3 or A5 case) measurements are comparable and their difference is within the implementation-defined configurable value, say X dB). If this difference between the Pcell and the Scell (event A2 case) or the Serving and the Neighbour cells (event A3 or A5 case) is larger than the predetermined threshold, then the device shall not perform any modifications to measurement values in A2 or A3/A5 MR report to the network.

In an example, the disclosed technique provides for optimizing transition to connected mode while in cell edge. While UE has to perform RRC Resume request UE will check the current measured signal conditions (example RSRP). If current signal condition is better than an implementation specific configurable threshold/criteria (example RSRPThreshold1>current RSRP>RSRPThreshold2) then UE can use a Supplementary Uplink (SUL) to trigger Resume Request. if SUL has been configured by the network, the UE may not perform cell reselection for T1 time (T1 time is to avoid Cell reselection during Resume Request).

While current signal condition is not better than an implementation specific configurable threshold/criteria (example RSRP<RSRPThreshold2), the UE may first perform cell reselection then trigger Resume Request if necessary.

The UE will set two UE specific RSRPThreshold1 and RSRPThreshold2 (RSRPThreshold1>RSRPThreshold2) before triggering Resume Request to go connected mode.

UE will set these two RSRP threshold value based on signal condition, e.g., calculated path loss, RSRQ, SINR, cell id, PLMN id etc. and keep modifying these threshold parameters based on reinforcement learning.

While UE has to perform RRC Resume request UE will check the current measured RSRP. If RSRPThreshold1>current measured RSRP>RSRPThreshold2, UE will use Supplementary Uplink to trigger Resume Request. UE will not perform cell reselection for T1 time. (T1 time is to avoid Cell reselection during Resume Request).

While the current measured RSRP<RSRPThreshold2, the UE will first perform cell reselection then trigger Resume Request. According to the present disclosure:

1. Using SUL: If UE is at the cell edge it is very much possible that UE power may not be enough to reach to NW. At that condition if UE use SUL (low Frequency UL), there is a possibility that Resume Request will be successful provided NW has configured both SUL (Supplementary Uplink) and NUL (Normal Uplink) to UE.

2. Triggering Cell Reselection before Resume Request: If UE RSRP is too low e.g., RSRP<RSRPThreshold2, there will be a possibility UE might reselect to another cell before Resume request succeeded. In that case UE will fall back to idle mode according to 3GPP. Triggering cell reselection first and then sending Resume request will save UE power and make the transition to connected mode faster (e.g., without falling back to idle mode).

Figure 20:
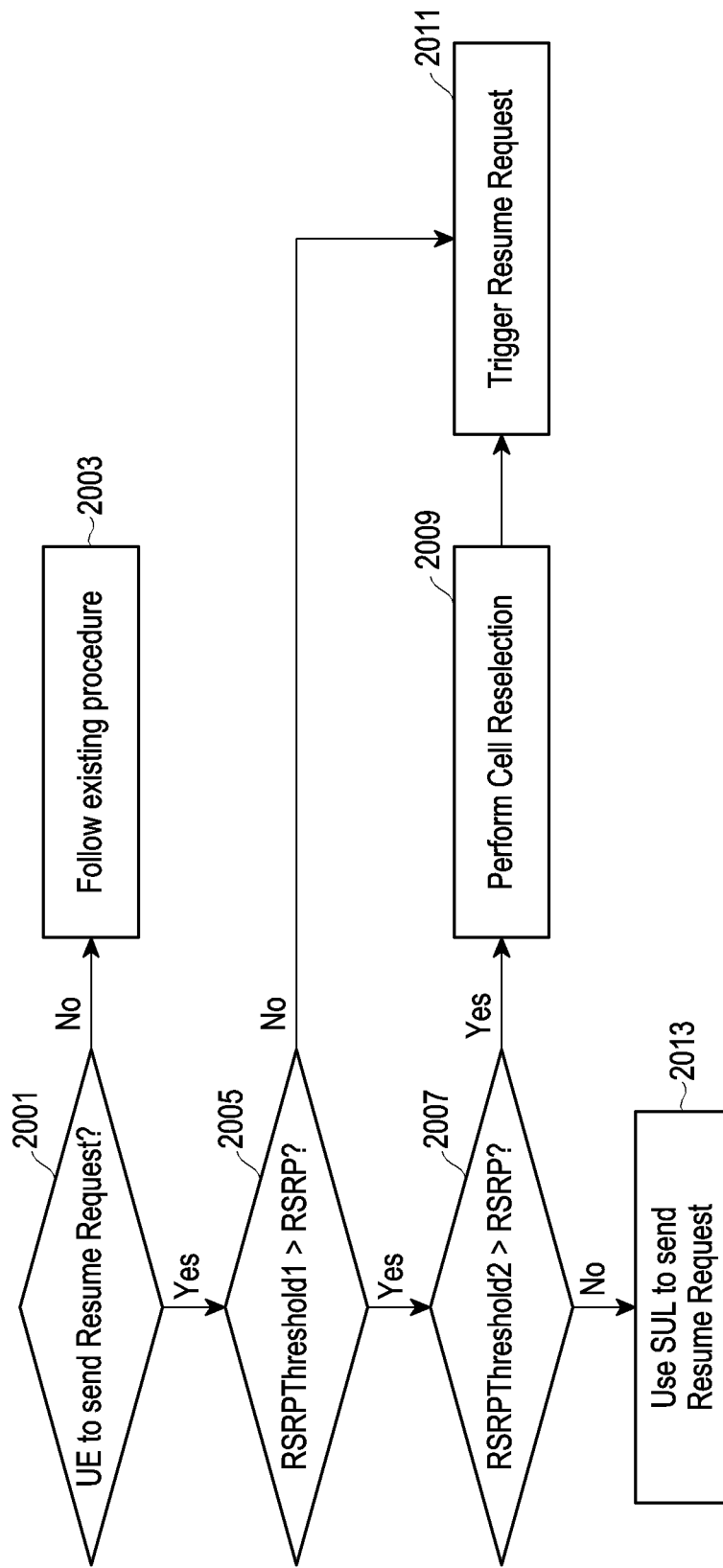
FIG. 20 is a flowchart illustrating example transition flow to connected mode, according to various embodiments.

FIG. 20 is a flowchart illustrating example transition flow to connected mode, according to various embodiments. As shown in FIG. 20, at 2001, it is determined if the UE needs to send the RRC Resume Request. If no, then, at 2003, the existing procedure is followed. If the UE needs to send the RRC Resume Request, then at 2005, it is determined if measured RSRP<RSRPThreshold1. If the current measured RSRP is greater than RSRPThreshold1 at 2005, then at 2011, the resume request is triggered. If the current measured RSRP is less than RSRPThreshold1 at 2005, then at 2007, it is determined if the current measured RSRP<RSRPThreshold2. If the current measured RSRP is less than RSRPThreshold2 at 2007, then at 2009, cell reselection is performed, and the method moves to 2011. If the current measured RSRP is greater than RSRPThreshold2 at 2007, then at 2013, SUL is used to send the RRC Resume Request.

In an embodiment, the disclosed technique provides for optimizing on demand SI request. Accordingly, while UE has to perform on demand SI request. UE will check the current measured signal conditions (example RSRP). If current signal condition is better than an implementation specific configurable threshold/criteria (example RSRPThreshold1>the current measured RSRP>RSRPThreshold2) then UE can use Supplementary Uplink to trigger On demand SI Request if SUL has been configured by the network, the UE may not perform cell reselection for T1 time (T1 time is to avoid Cell reselection during on demand SI Request).

While current signal condition is not better than an implementation specific configurable threshold/criteria (for example, the current measured RSRP<RSRPThreshold2), UE may first perform cell reselection then trigger on demand SI request, if necessary.

In an embodiment, the UE sets two UE specific RSRPThreshold1 and RSRPThreshold2 (RSRPThreshold1>RSRPThreshold2) before triggering on demand SI request. The UE may set these two RSRP threshold value based on signal condition e.g., calculated path loss, RSRQ, SINR, cell id, PLMN id etc. and keep modifying these threshold parameters based on reinforcement learning.

While UE has to perform on demand SI request, UE may check the current measured RSRP. If current RSRPThreshold1>the current measured RSRP>RSRPThreshold2, UE may use Supplementary Uplink to trigger on demand SI Request. UE will not perform cell reselection for T1 time. (T1 time is to avoid Cell reselection during on demand SI request).

While the current measured RSRP<RSRPThreshold2, UE may first perform cell reselection then trigger on demand SI if needed.

Figure 21:
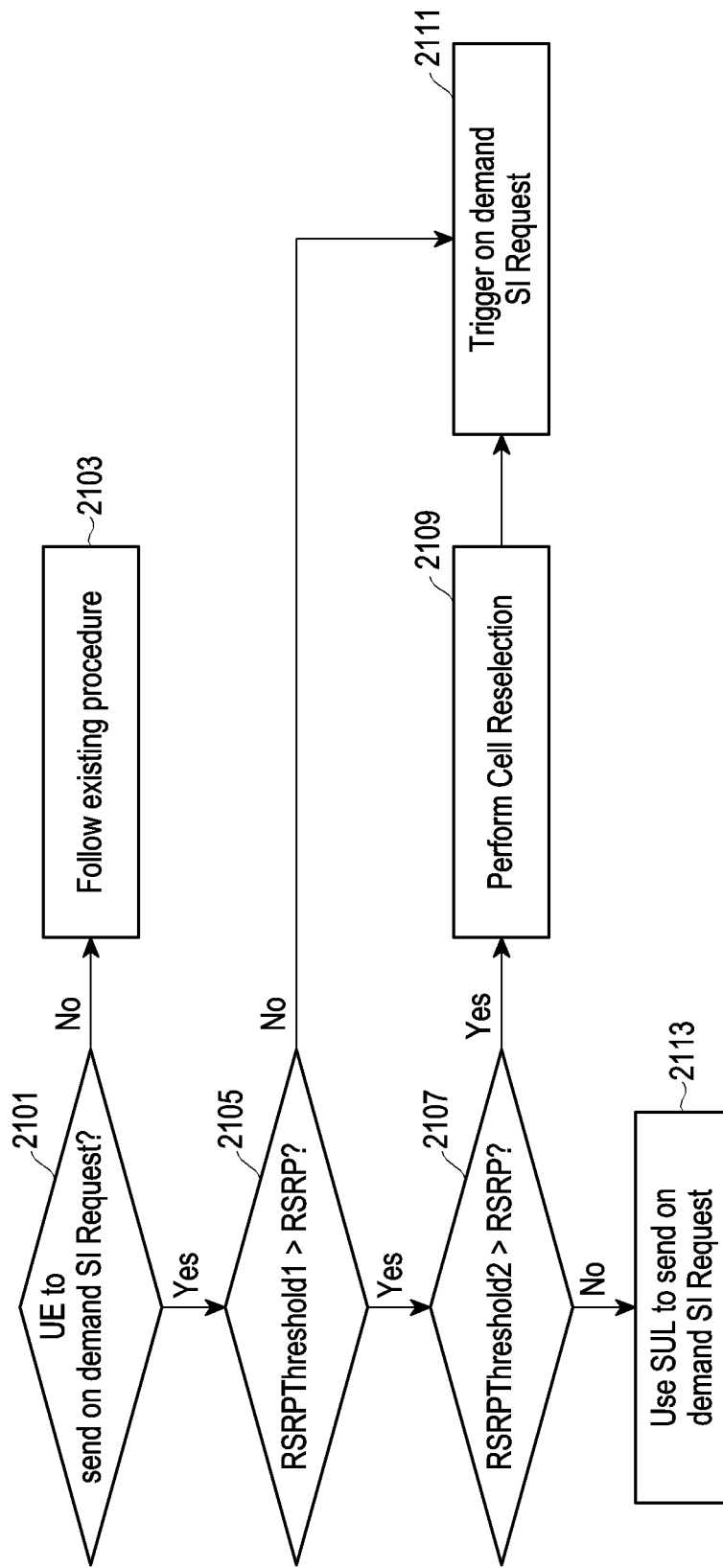
FIG. 21 is a flowchart illustrating an example method for optimizing on demand SI request, according to various embodiments.

FIG. 21 is a flowchart illustrating an example method for optimizing on demand SI request, according to various embodiments. At 2101, the UE determines if the UE has to perform on demand SI request. If no, then, then at 2103, the existing procedure is followed. If yes, then at 2105, it is determined if current signal condition is better than an implementation specific configurable threshold/criteria, e.g., RSRPThreshold1>the current measured RSRP. If the current measured RSRP is greater than RSRPThreshold1 at 2105, then at 2111, the on demand SI request is triggered. If the current measured RSRP is less than RSRPThreshold1 at 2105, then at 2107, it is determined if RSRPThreshold2>the current measured RSRP. If the current measured RSRP is less than RSRPThreshold2 at 2107, then at 2109, cell reselection is performed, and the method moves to 2111. If the current measured RSRP is greater than RSRPThreshold2 at 2107, then at 2113, SUL is used to send the on demand SI Request.

According to this aspect:

1. Using SUL: If UE is at the cell edge it is very much possible that UE power may not be enough to reach the network. At that condition, if the UE uses SUL (low-Frequency UL), there is a possibility that the Resume request will be successful provided that the network has configured both SUL (Supplementary Uplink) and NUL (Normal Uplink) to the UE.

2. Triggering Cell Reselection before Resume Request: If the UE RSRP is too low e.g., RSRP<RSRPThreshold2, there will be a possibility that the UE might reselect to another cell before on-demand SI request succeeded. In that case, the UE will fall back to the idle mode according to the 3GPP. Triggering cell reselection first and then sending on-demand SI request (if needed at all) will save UE power and make the transition to connected mode faster (e.g., without falling back to the idle mode).

In an embodiment, the present disclosure provides techniques for advertised modified band combo to utilize RRC Inactive mode. Whenever the UE is pushed to the RRC inactive mode, e.g., whenever the network sends the RRC Release with suspend message, the UE stores the associated cell information. At the same time, the UE also learn cell id, PLMN id, and band id of those cells which do not support the inactive mode, e.g., either those cells that send RRC Release without suspend message or Reject RRC Resume Request and sends back the UE to the idle mode. While in connected mode the UE advertises only those band combinations for which the Pcell will support the inactive mode based on previous learning. This way the UE will always be on those cells which will support the inactive mode, e.g., once active data session is over, the UE will stay in the RRC inactive mode and can avoid being in the RRC idle mode. This optimization is very useful for those UEs which need to stay always in the RRC inactive mode e.g., URLLC Kind of UE.

For Example:
UE supports these following band combinations:
n2AA+n5A+n261A
n261AA+n2A+n66A
n71AA+n260A+n5A And at a particular location, network supports Inactive mode only in Sub6 or FR1 bands.

Figure 22:
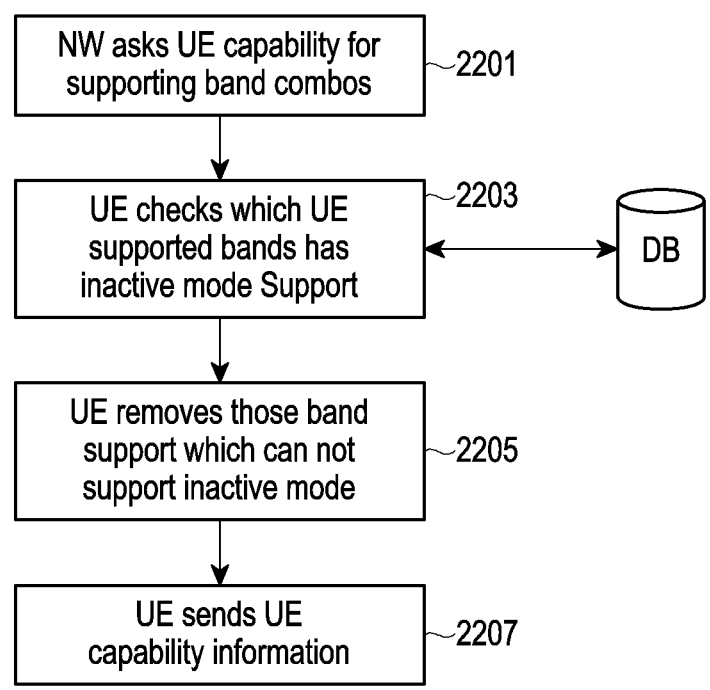
FIG. 22 is a flowchart illustrating an example method for advertised modified band combo to utilize RRC inactive mode, according to various embodiments.

In this scenario, UE can advertise only these band combinations to avoid being in Idle mode:
n2AA+n5A+n261A
n71AA+n260A+n5A FIG. 22 is a flowchart illustrating an example method for advertised modified band combo to utilize RRC inactive mode, according to various embodiments. As shown in FIG. 22, at 2201, the UE receives capability enquiry from the network (NW) with specific band combo support or for all band combination support. At 2203, the UE checks which network bands at that location does not support Inactive mode using the associated cell information. At 2205, the UE removes those primary band combinations which does not support the inactive mode. At 2207, the UE sends UE capability information.

Figure 23:
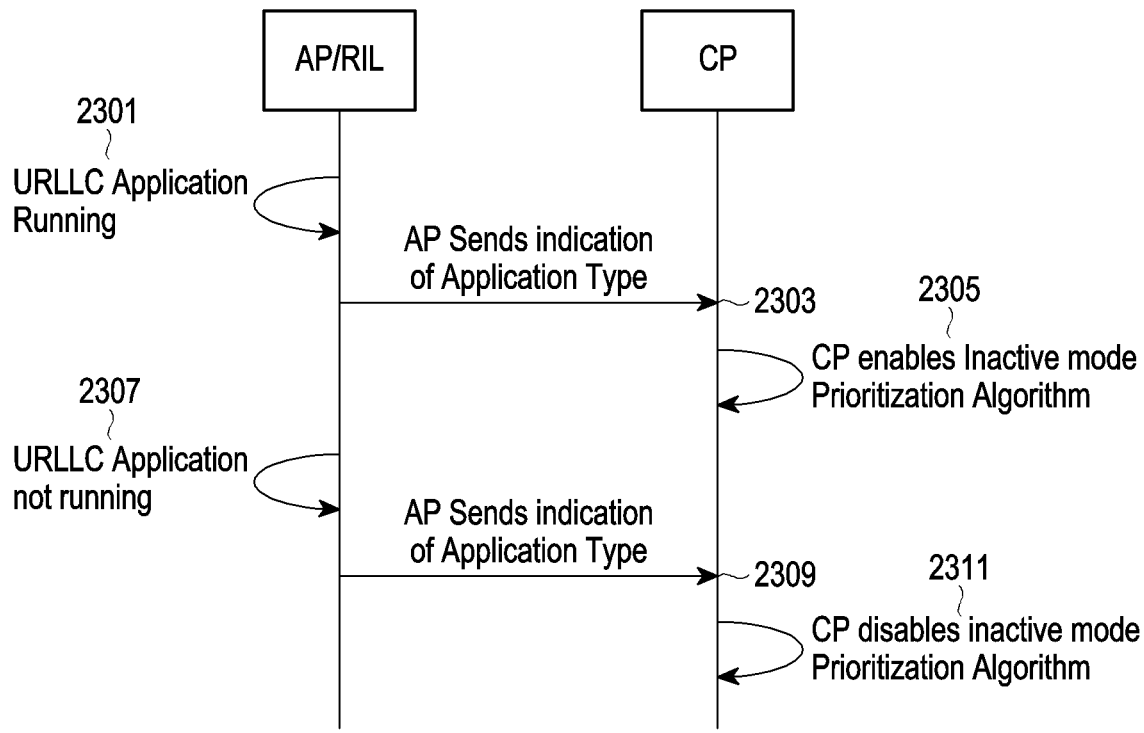
FIG. 23 is a signal flow diagram illustrating example cell prioritization based on application type, according to various embodiments.

In an embodiment, the present disclosure provides techniques for cell prioritization based on application type, as shown in FIG. 23. The UE can enable or disable disclosed techniques and methods based on the higher layer (NAS, AP processor commands, etc.) or the Application usage (e.g., URLLC kind of Application or V2X Supporting UE) to effectively manage battery and computation overheads. For example, as shown in FIG. 23, if a URLLC application is running on the UE at 2301, then the Application Processor (AP)/Radio Interface Layer (RIL) sends this information to Communication Processor (CP) at 2303. Accordingly, the disclosed techniques for prioritizing the inactive mode are enabled at 2305. However, if the URLLC application is not running on the UE at 2307, the AP/RIL sends this information to CP at 2309. Accordingly, the disclosed techniques for prioritizing the inactive mode are disabled at 2311. Hence, the disclosed techniques may be enabled or disabled in the UE based on the higher layer commands (example based on when there is URLLC application active on the device). Additional actions not to be done to overcome computation overhead and battery. In an embodiment, the disclosed techniques may be controlled based on the UE movement sensor, e.g., based on which UE is aware based on the past history about the effectiveness & success of the techniques based on its location and past results.

Figure 24:
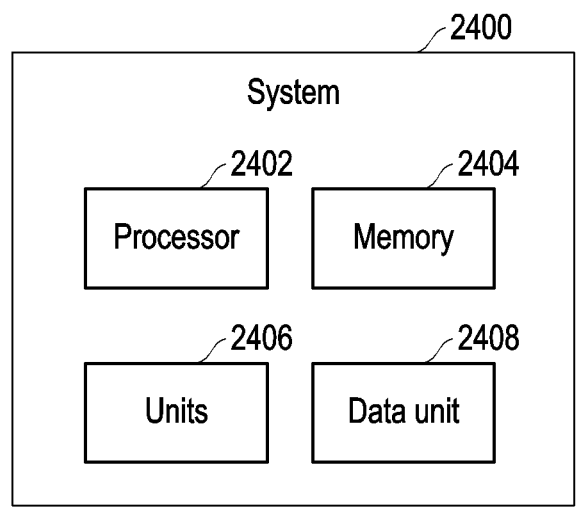
FIG. 24 is a block diagram illustrating an example configuration of a system for cell reselection in a wireless communication system, according to various embodiments.

FIG. 24 is a block diagram illustrating an example configuration of a system/apparatus for cell reselection in a wireless communication system, according to various embodiments. It should be noted that the system/apparatus 2400 may be a part of a UE. In an embodiment, the system/apparatus 2400 may be connected to the UE. The system/apparatus 2400 may include, but is not limited to, a processor (e.g., including processing circuitry) 2402, memory 2404, units (e.g., including various processing circuitry and/or executable program instructions) 2406, and data unit (e.g., including various processing circuitry and/or executable program instructions) 2408. The units 2406 and the memory 2404 may be coupled to the processor 2402. The system 2400 may be configured to perform methods as discussed in reference to FIGS. 10-23. The system/apparatus 2400 may be implemented by including a transceiver for transmitting/receiving a signal and the processor 2402.

The processor 2402 can be a single processing unit or several units, all of which could include multiple computing units. The processor 2402 may be implemented as one or more microprocessors, microcomputers, microcontrollers, digital signal processors, central processing units, state machines, logic circuitries, and/or any devices that manipulate signals based on operational instructions. Among other capabilities, the processors 2402 are configured to fetch and execute computer-readable instructions and data stored in the memory 2404, respectively.

The memory 2404 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The units 2406 amongst other things, include routines, programs, objects, components, data structures, etc., which perform particular tasks or implement data types. The units 2406 may also be implemented as, signal processor(s), state machine(s), logic circuitries, and/or any other device or component that manipulate signals based on operational instructions.

Further, the units 2406 can be implemented in hardware, instructions executed by a processing unit, or by a combination thereof. The processing unit can comprise a computer, a processor, such as the processor 2402, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In an embodiment of the present disclosure, the units 2406 may be machine-readable instructions (software) which, when executed by a processor/processing unit, perform any of the described functionalities.

The data unit 2408 may, amongst other things, serve as a repository for storing data processed, received, and generated by one or more of the units 2406, respectively.

Accordingly, the present disclosure provides techniques to efficiently utilize RRC inactive mode, reduce signaling overhead and power consumption.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Benefits, other advantages, and solutions to problems have been described above with regard to various example embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for cell reselection by a user equipment (UE) in a wireless communication system, the method comprising:
   determining that the UE is in an inactive mode supported by a serving cell;
   while the UE is in the inactive mode:
      detecting a trigger for reselection of the serving cell for the UE;
      identifying based on the detection, a plurality of neighbouring cells available for being connected to the UE;
      prioritizing a first cell among the plurality of the neighbouring cells based on the first cell supporting the inactive mode of the UE; and
      selecting, based on the prioritization, the first cell, from among the plurality of the neighbouring cells, for connecting.

2. The method of claim 1, further comprising determining, before selecting the first cell, that the first cell supports the inactive mode based on associated cell information, wherein the cell information indicates that the first cell has previously supported the inactive mode.

3. The method of claim 1, wherein the trigger comprises an event of network parameters of the serving cell being below a specified threshold.

4. The method of claim 3, wherein the network parameters include signal strength including reference signal received power (RSRP) and reference signal received quality (RSRQ) parameters.

5. The method of claim 1, wherein network parameters of the first cell are above a specified threshold.

6. The method of claim 1, wherein the first cell belongs to a first radio access technology (RAT) and the serving cell belongs to a second RAT.

7. The method of claim 1, wherein the serving cell and the first cell belong to a same RAT.

8. The method of claim 1, wherein the serving cell belongs to a first radio access network (RAN) based notification area (RNA) and the first cell belongs to a second RNA.

9. The method of claim 1, wherein the serving cell and the first cell belong to a same RNA.

10. The method of claim 1, further comprising:
    selecting a second cell, from among the plurality of neighbouring cells, for connecting with the UE, based on the UE being disconnected from the first cell, wherein the second cell supports the inactive mode of the UE; and
    connecting the UE in an inactive mode based on being connected with the second cell.

11. The method of claim 1, further comprising:
    determining that network parameters of the serving cell are below a specified threshold;
    selecting the first cell based on the determination, wherein network parameters of the first cell are above the specified threshold; and
    transmitting a request for system information (SI) using the first cell.

12. The method of claim 1, further comprising:
    determining that network parameters of the serving cell are below a specified threshold;
    selecting the first cell based on the determination, wherein network parameters of the first cell are above the specified threshold; and
    transmitting a radio resource control (RRC) resume request using the first cell.

13. The method of claim 1, further comprising:
    determining that the UE is moving to an Out-Of-Service (OOS) area;
    storing inactive mode context of the UE based on being connected with the first cell; and
    connecting the UE with the first cell supporting the inactive mode based on the stored inactive mode context, based on the UE moving back in the range of the first cell.

14. The method of claim 13, wherein the inactive mode context comprises a list of most recently used (MRU) frequencies supporting the inactive mode.

15. The method of claim 13, comprising:
    determining that the first cell and the serving cell belong to different radio access network notification area (RNA); and
    sending an RNA update (RNAU) with the stored inactive mode context, based on the determination.

16. A user equipment (UE) for cell reselection in a wireless communication system, the UE comprising:
    memory storing instructions; and
    at least one processor coupled to the memory, the at least one processor comprising processor circuitry, wherein the instructions, when executed by the at least one processor, individually and/or collectively, cause the UE to:
       determine that the UE is in an inactive mode supported by a serving cell;
       while the UE is in the inactive mode:
          detect a trigger for reselection of the serving cell for the UE;

identify, based on the detection, a plurality of neighbouring cells available for being connected to the UE;
prioritize a first cell among the plurality of the neighbouring cells based on the first cell supporting the inactive mode of the UE; and
select, based on the prioritization, a first cell, from among the plurality of the neighbouring cells, for connecting.

17. The UE of claim 16, wherein the instructions, when executed by the at least one processor, individually and/or collectively, cause the UE further to determine, before selecting the first cell, that the first cell supports the inactive mode based on associated cell information, wherein the cell information indicates that the first cell has previously supported the inactive mode.

18. The UE of claim 16, wherein the instructions, when executed by the at least one processor, individually and/or collectively, cause the UE further to:
select a second cell, from among the plurality of neighbouring cells, for connecting with the UE, based on the UE being disconnected from the first cell, wherein the second cell supports the inactive mode of the UE; and
move the UE to an inactive mode based on being connected with the second cell.

19. The UE of claim 16, wherein the instructions, when executed by the at least one processor, individually and/or collectively, cause the UE further to:
determine that network parameters of the serving cell are below a specified threshold;
select the first cell based on the determination, wherein network parameters of the first cell are above the specified threshold; and
transmit a request for system information (SI).

20. The UE of claim 16, wherein the instructions, when executed by the at least one processor, individually and/or collectively, cause the UE further to:
determine that network parameters of the serving cell are below a specified threshold;
select the first cell based on the determination, wherein network parameters of the first cell are above the specified threshold; and
transmit a radio resource control (RRC) resume request.

* * * * *